United States Patent
Wu

(10) Patent No.: US 11,353,658 B2
(45) Date of Patent: Jun. 7, 2022

(54) MULTI-FIBER SPLICE PROTECTOR, FIBER OPTIC CABLE ASSEMBLY INCORPORATING SAME, AND FABRICATION METHOD

(71) Applicant: CORNING RESEARCH & DEVELOPMENT CORPORATION, Corning, NY (US)

(72) Inventor: Qi Wu, Painted Post, NY (US)

(73) Assignee: Corning Research & Development Corporation, Corning, NY (US)

( * ) Notice: Subject to any disclaimer, the term of this patent is extended or adjusted under 35 U.S.C. 154(b) by 0 days.

(21) Appl. No.: 17/205,717

(22) Filed: Mar. 18, 2021

(65) Prior Publication Data

US 2021/0302656 A1    Sep. 30, 2021

Related U.S. Application Data

(60) Provisional application No. 63/002,711, filed on Mar. 31, 2020.

(51) Int. Cl.
*G02B 6/255* (2006.01)
*G02B 6/12* (2006.01)

(52) U.S. Cl.
CPC ......... *G02B 6/2558* (2013.01); *G02B 6/2551* (2013.01); *G02B 2006/12192* (2013.01)

(58) Field of Classification Search
CPC .............. G02B 6/2551; G02B 6/2558; G02B 2006/12192
See application file for complete search history.

(56) References Cited

U.S. PATENT DOCUMENTS

| 4,077,702 A | 3/1978 | Kunze et al. |
| 5,231,688 A | 7/1993 | Zimmer |
| (Continued) | | |

FOREIGN PATENT DOCUMENTS

| CN | 105717576 A | 6/2016 |
| EP | 0278423 A2 | 8/1988 |
| (Continued) | | |

OTHER PUBLICATIONS

International Search Report and Written Opinion of the International Searching Authority; PCT/US2021/025200; dated Jul. 1, 2021; 17 pages; European Patent Office.

*Primary Examiner* — Ryan A Lepisto
(74) *Attorney, Agent, or Firm* — Kapil U. Banakar

(57) ABSTRACT

A multi-fiber splice protector includes a strength member having at least one wall arranged in a tubular shape with a longitudinal opening extending through the wall to permit passage of a coated optical fiber into an inner cavity, with a thermoplastic hotmelt material arranged in the inner cavity. The longitudinal opening has a first width between 1 and 2 times the diameter of one coated optical fiber, while the inner cavity has a second width that is significantly greater than the first width to permit fusion spliced optical fibers to be not exclusively arranged in a 1-D array in the inner cavity. A fiber optic cable assembly including a multi-fiber splice protector with thermoplastic hotmelt material encapsulating fusion splice joints is further provided. Additionally provided is a method for forming a fiber optic cable assembly.

25 Claims, 10 Drawing Sheets

(56) References Cited

U.S. PATENT DOCUMENTS

| | | | |
|---|---|---|---|
| 5,367,591 A * | 11/1994 | Seike | G02B 6/2558 |
| | | | 156/158 |
| 5,416,873 A * | 5/1995 | Huebscher | G02B 6/2558 |
| | | | 385/95 |
| 5,731,051 A | 3/1998 | Fahey et al. | |
| 5,832,162 A | 11/1998 | Sarbell | |
| 6,485,199 B1 | 11/2002 | Ware et al. | |
| 6,738,555 B1 | 5/2004 | Cooke et al. | |
| 6,869,227 B2 | 3/2005 | Del et al. | |
| 7,461,981 B2 | 12/2008 | Yow et al. | |
| 8,678,670 B2 | 3/2014 | Takahashi et al. | |
| 8,702,326 B2 | 4/2014 | Faulkner et al. | |
| 8,740,479 B2 | 6/2014 | Shitama et al. | |
| 10,018,798 B2 * | 7/2018 | Larson | G02B 6/46 |
| 10,921,540 B2 * | 2/2021 | Wu | G02B 6/255 |
| 10,976,492 B2 * | 4/2021 | Wu | G02B 6/255 |
| 11,131,811 B2 * | 9/2021 | Wu | G02B 6/2558 |
| 2011/0286704 A1 | 11/2011 | Rubinstein et al. | |
| 2016/0116683 A1 | 4/2016 | Murashima et al. | |
| 2018/0024294 A1 * | 1/2018 | Wang | G02B 6/2558 |
| | | | 385/78 |
| 2019/0137689 A1 | 5/2019 | Filipowicz et al. | |
| 2019/0369332 A1 * | 12/2019 | Bohbot | G02B 6/2558 |
| 2021/0033793 A1 * | 2/2021 | Wu | G02B 6/2558 |

FOREIGN PATENT DOCUMENTS

| | | |
|---|---|---|
| EP | 0537413 A1 | 4/1993 |
| EP | 3229051 A1 | 10/2017 |
| JP | 55-129305 A | 10/1980 |
| JP | 11-174237 A | 7/1999 |
| JP | 11-326677 A | 11/1999 |
| WO | 99/59013 A1 | 11/1999 |
| WO | 2009/040271 A2 | 4/2009 |
| WO | 2018/132918 A1 | 7/2018 |
| WO | 2018/175122 A1 | 9/2018 |
| WO | 2020/219477 A1 | 10/2020 |

* cited by examiner

MULTI-FIBER SPLICE PROTECTOR, FIBER OPTIC CABLE ASSEMBLY INCORPORATING SAME, AND FABRICATION METHOD

PRIORITY APPLICATION

This application claims the benefit of priority of U.S. Provisional Application No. 63/002,711, filed on Mar. 31, 2020, the content of which is relied upon and incorporated herein by reference in its entirety.

BACKGROUND

The disclosure relates generally to multi-fiber splice protectors and fiber optic cable assemblies incorporating splice protectors, as well as methods for fabricating fiber optic cable assemblies.

Optical fibers are useful in a wide variety of applications, including the telecommunications industry for voice, video, and data transmission. In a telecommunications system that uses optical fibers, there are typically many locations where fiber optic cables, which carry the optical fibers, connect to equipment or other fiber optic cables. Fiber optic cables are frequently produced by extruding thermoplastic material (e.g., polyvinylchloride (PVC)) over at least one coated optical fiber.

FIG. 1 is a cross-sectional view of an exemplary coated optical fiber 10 that includes a glass core 12, glass cladding 14 surrounding the glass core 12, and a polymer coating 20 (which may include multiple coating layers, such as an inner primary coating layer 16 and an outer secondary coating layer 18) surrounding the glass cladding 14. The inner primary coating layer 16 may be configured to act as a shock absorber to minimize attenuation caused by any microbending of the coated optical fiber 10. The outer secondary coating layer 18 may be configured to protect the inner primary coating layer 16 against mechanical damage, and to act as a barrier to lateral forces. The outer diameter of the coated optical fiber 10 may be about 200 μm, about 250 μm, or any other suitable value. Optionally, an ink layer (e.g., having a thickness of about 5 μm) may be arranged over the outer secondary coating layer 18 of the coated optical fiber 10 to color the fiber (e.g., as is commonly used in ribbonized fibers), or a coloring agent may be mixed with the coating material that forms the outer secondary coating layer 18. An additional buffer coating ("buffer"; not shown), may be applied to the coated optical fiber 10 to provide additional protection and allow for easier handling, effectively forming a cable. The buffer may be embodied in a layer of different material applied to the polymer coating 20, thereby forming a "tight buffer" closely surrounding (intimately contacting and conforming to) the polymer coating 20. Alternatively, the buffer may be embodied in a pre-formed tube (also known as a furcation tube or buffer tube) that has an inner diameter larger than the polymer coating 20 and into which the coated optical fiber 10 is inserted, thereby forming a "loose buffer," wherein this additional buffer may have an outer diameter of about 900 μm.

In this disclosure, the term "optical fiber" (or "fiber") will be used in a generic sense and may encompass bare optical fibers, coated optical fibers, or buffered optical fibers, as well as optical fibers including different sections corresponding to these fiber types, unless it is clear from the context which of the types is intended. "Bare optical fibers" (including "bare glass optical fibers") or "bare sections" are those with no coating present on the fiber cladding. "Coated optical fibers" or "coated sections" include a single or multi-layer coating (typically an acrylic material) surrounding the fiber cladding and have a nominal (i.e., stated) diameter no greater than twice the nominal diameter of the bare optical fiber. "Buffered optical fibers" or "buffered sections" are coated optical fibers with an additional buffer that increases the nominal diameter of the optical fiber to more than twice the nominal diameter of the bare optical fiber, with 900 μm being the most typical nominal diameter. Buffered optical fibers may also be referred to as "buffered cables." Finally, the term "unbuffered optical fibers" refers to optical fibers without a buffer, and therefore may encompass either bare optical fibers or coated optical fibers.

Optical fiber fusion splicing, which is the process by which a permanent, low-loss, high-strength, fused (or welded) joint is formed between two optical fibers, typically involves multiple tasks. First, polymer coatings (e.g., coating layers 16, 18 of FIG. 1) of coated optical fibers (e.g., coated optical fiber 10 of FIG. 1) are stripped to expose glass cladding (e.g., glass cladding 14 of FIG. 1). Next, flat fiber end faces are formed, typically by cleaving exposed glass portions of the fibers. Then the fibers are laterally aligned to each other. The fiber tips must be heated to their softening point and pressed together to form a joint. Checks such as loss estimation and proof testing (to ensure long-term mechanical reliability) may be performed. The completed fusion splice must also be protected from the environment using packaging, which serves to shield fiber surfaces from mechanical degradation (e.g., abrasion) and chemical degradation (e.g., humidity) to ensure that splices exhibit long-term reliability. Optical fibers must typically be able to withstand service temperatures spanning at least a range of from −40° C. to 85° C. without suffering significant mechanical and/or optical performance degradation.

A desirable fusion splice package should be relatively inexpensive, easy and quick to apply, resistant to thermal cycling, and compact in size. Moreover, a desirable fusion splice package should impart minimal geometric distortion to the splice, and should minimize mechanical loads (e.g., tensile, bending, or torsion loads) applied to the splice. Various splice protection strategies have been developed to address these concerns, segregated into two general categories: (1) splice protectors, which are typically rigid in character, and (2) recoats. Examples of conventional splice protectors include (i) heat shrink protection sleeves with integrated strength members (e.g., splints), and (ii) hard plastic (e.g., clam-shell type) cases, which serve to transfer mechanical loads across the splice joint. A recoat restores a flexible polymer coating onto a bare fusion splice, whereby the mechanical integrity of the splice depends on the fusion splice itself.

An exemplary heat shrink protection sleeve 30 used to protect a splice joint 32 formed between two coated optical fibers 10A, 10B is schematically illustrated in FIGS. 2A and 2B. The heat shrink protection sleeve 30 includes a generally cylindrical inner tube 34 (e.g., a melt-flow adhesive material such as ethylene vinyl acetate (EVA)) and a generally cylindrical outer tube 36 (e.g., a polyolefin and/or a fluorinated polymer such as polytetrafluorethylene (PTFE)), wherein the outer tube 36 generally surrounds the inner tube 34, and the inner tube 34 defines an interior passage 40. The outer tube 36 is required for conventional heat shrink protection sleeves because the melt-flow adhesive material (e.g., EVA) has a very high viscosity and a very low softening temperature (typically only about 100° C.). To ensure that the inner tube 34 wraps around the optical fibers 10A, 10B and the splice joint 32, the more temperature-resistant outer tube 36 is considered indispensable when the splice is intended for operation over a high temperature range of up to about 85° C.

In use, the heat shrink protection sleeve 30 is positioned over a fusion spliced section of two optical fibers 10A, 10B including the splice joint 32 arranged between (pre-stripped) glass cladding segments 14A, 14B of the respective optical fibers 10A, 10B. Upon application of heat (typically within an oven), the inner tube 34 melts around the optical fibers 10A, 10B, the glass cladding segments 14A, 14B, and the splice joint 32. The outer tube 36, which includes a cylindrical outer surface 38, may include some heat shrinking capability to help the adhesive distribute around the fused optical fibers 10A, 10B. Although not shown in FIGS. 2A and 2B, a heat shrink protection sleeve may further include a rigid strength member, such as a stainless steel rod bound by the adhesive material.

Groups of coated optical fibers (e.g., 4, 8, 12, or 24 optical fibers) may be held together using a matrix material, intermittent inter-fiber binders ("spiderwebs"), or tape to form "optical fiber ribbons" or "ribbonized optical fibers" to facilitate packaging within cables. For example, optical fiber ribbons are widely used in cables for high capacity transmission systems. Some modern cables in large-scale data centers or fiber-to-the-home networks may contain up to 6,912 optical fibers, and cables having even higher optical fiber counts are under development. Optical fibers that form a ribbon are arranged in parallel in a linear (i.e., one-dimensional) array, with each fiber having a different color for ease of identification. FIG. 3 provides a cross-sectional view of a multi-fiber ribbon 42, which includes twelve optical fibers 44A-44L and a matrix 46 encapsulating the optical fibers 44A-44L. The optical fibers 44A-44L are substantially aligned with one another in a generally parallel configuration, preferably with an angular deviation of no more than one degree from true parallel at any position. Although twelve optical fibers 44A-44L are shown in the multi-fiber ribbon 42, it is to be appreciated that any suitable number of multiple fibers (but preferably at least four fibers) may be employed to form optical fiber ribbons suitable for a particular use.

Mass fusion splicing is a high throughput technology for interconnecting a large number of fibers in a ribbon format. First and second segments of up to twelve fibers arranged in a linear array can be fusion spliced simultaneously by mass fusion splicing. Since sequential formation of twelve fusion splices using a traditional single fiber fusion splicing technique is very time-consuming, the ability to fusion splice linearly arrayed segments of up to twelve fibers simultaneously enables entire ribbons to be spliced rapidly, thereby improving manufacturing throughput. Mass fusion splicing also allows for potential material savings. It enables migration from common indoor distribution cables with 900 µm fibers to smaller mini-distribution cables with 250 µm or 200 µm fibers, which is more cost-effective.

Heat shrink protection sleeves embody a proven technology with high reliability; however, they are bulky, inflexible, and time-consuming to apply. Heat shrink protection sleeves similar to those outlined above have also been applied to protect optical fiber ribbon splices, which include multiple fusion splices between first and second arrays of parallel optical fibers contained in first and second optical fiber ribbon segments, respectively. In such a context, an integrated strength member typically includes a flat surface to support the fusion spliced fiber arrays, a thermoplastic inner tube melted around the spliced ribbon cables and the integrated strength member, and a more temperature-resistant outer tube encasing the thermoplastic inner tube. The cross-section of a typical ribbon splice protector is 4 mm×4.5 mm, and the length is about 40 mm. Such a splice protector is suitable for interfacing with optical fiber ribbons, but not jacketed cables since the cross-sectional width of a ribbon-type splice protector is much larger than that of a jacketed cable.

For end uses requiring smaller cable widths, loose tube cables having a round cross-section with an outer diameter of 2 mm or 3 mm are commonly employed. Alternatively, a round cable may include a rollable optical fiber ribbon, such as disclosed in U.S. Pat. No. 9,939,599 B2 (with the content of such patent being incorporated by reference herein). As noted in the foregoing patent, a rollable optical fiber ribbon may include a ribbon body formed over flexible polymeric material such that a plurality of optical fibers are reversibly movable between a position in which the optical fibers are arranged in a one-dimensional array and a position in which the optical fibers are arranged in a curved shape from a cross-sectional view. Alternatively, a rollable optical fiber ribbon may include a group of coated optical fibers held together with intermittent inter-fiber binders (e.g., spiderwebs) such as described previously herein. In a broad sense, a rollable optical fiber ribbon may include any combination of multiple optical fibers with a binding structure at least intermittently arranged between adjacent optical fibers, with the binding structure configured to permit the optical fibers to be arranged in a one-dimensional array or to be rolled into a non-linear (e.g., spiral, circular, etc.) configuration.

Conventional mass fusion splice technology, as well as conventional splice protection technology, only supports one-dimensional arrays of optical fiber splices. For splicing of fibers of small diameter round cables, it is necessary to ribbonize loose tube fibers or arrange rollable optical fiber ribbons in a one-dimensional array to permit mass fusion splicing, and the mass fusion spliced one-dimensional array of fibers is typically protected in a bulky heat shrink sleeve. FIG. 4 illustrates a conventional cable assembly 50 incorporating first and second loose tube-type cables 52A, 52B bearing pre-coated loose optical fibers 54A, 54B, with stripped sections thereof that are mass fusion spliced in a one-dimensional array in a fusion splice region 56 that is protected by a conventional ribbon splice protector 60. The ribbon splice protector 60 includes an outer heat shrink member 64 and an inner thermoplastic member 62 that surrounds the fusion splice region 56 as well as stripped sections (not shown) of the first and second loose optical fibers 54A, 54B. As shown in FIG. 4, the ribbon splice protector 60 has a much larger diameter or width than a diameter or width of each of the first and second loose tube-type cables 52A, 52B. Moreover, the width of each one-dimensional array of the pre-coated optical fibers 54A, 54B proximate to the inner thermoplastic member 62 is also greater than the diameter of each of the first and second loose tube-type cables 52A, 52B. The benefits of small round cables are thus defeated if a cable assembly incorporating small round cables involves a mass fusion splice connection. The size of conventional one-dimensional array splice protection technology limits the practical attainment of higher fiber density in fiber optic modules and cable assemblies.

One alternative to a heat shrink protection sleeve for protecting fusion spliced optical fiber ribbons includes a splice protector sleeve having a U-shaped cross-section that defines a cavity for receiving spliced ribbons, with addition of adhesive cement in the cavity of the splice protector sleeve to hold the spliced ribbons therein in a one-dimensional array. One such splice protector apparatus is disclosed in U.S. Patent Application Publication No. 2018/0024294 A1. Splice protectors with U-shaped cross-sectional shapes exhibit the same dimensional limitations as other ribbon splice protectors in terms of their width being greater than that of an optical fiber ribbon. Additionally, such splice protectors may not withstand strong bending forces from all directions without yielding, unless the thickness of such a splice protector is significantly increased.

In view of the foregoing, a need remains in the art for multi-fiber splice protectors and fiber optic cable assemblies incorporating fusion splices and splice protectors to address the above-described and other limitations associated with conventional splice protectors and fiber optic cable assemblies, as well as associated fabrication methods.

SUMMARY

Aspects of the present disclosure provide a multi-fiber splice protector, a fiber optic cable assembly, and a method for fabricating a fiber optic cable assembly. A strength member of a multi-fiber splice protector has at least one wall arranged in a tubular shape with a longitudinal opening (e.g., a slot) extending through an entire thickness of the at least one wall to permit passage of a coated optical fiber into an inner cavity of the splice protector, and a thermoplastic hotmelt material is arranged within the inner cavity. The longitudinal opening has a first width that is greater than a diameter of one coated optical fiber but smaller than two times the diameter of one coated optical fiber. The inner cavity has a second width that is significantly greater (e.g., at least two times, at least three times, at least four times, or at least five times greater) than the first width, to permit fusion spliced optical fibers to be not exclusively arranged in a one-dimensional array in the inner cavity. Providing a strength member with a longitudinal opening of a relatively narrow width avoids an undue reduction in bending strength and reduces the likelihood of inadvertent escape of optical fibers from the inner cavity before the thermoplastic material is solidified. Providing an inner cavity that is significantly wider than the longitudinal opening permits optical fibers to be arranged side-by-side within the inner cavity (i.e., in an arrangement other than exclusively a one-dimensional array), thereby enabling the splice protector to be compact in width. Further disclosed herein is a fiber optic cable assembly including first and second fiber optic cable sections, a plurality of splice joints joining ends of respective stripped sections of the first and second fiber optic cable sections to form a plurality of fusion spliced optical fibers, and a multi-fiber splice protector as described herein. Fusion spliced optical fibers of the plurality of fusion spliced optical fibers are not exclusively arranged in a one-dimensional array within the inner cavity, and a thermoplastic hotmelt material is present in the inner cavity of the strength member to encapsulate the plurality of fusion spliced optical fibers, including the plurality of splice joints as well as at least the stripped sections of the first and second pluralities of optical fibers. Further disclosed herein are method steps including heating a strength member as disclosed herein sufficiently to melt a thermoplastic hotmelt material arranged within the inner cavity of the strength member; sequentially inserting individual fusion spliced optical fibers through the longitudinal opening into the inner cavity while manipulating (e.g., folding or rolling) the fusion spliced optical fibers to cause fusion spliced optical fibers inserted into the inner cavity to not be exclusively arranged in a one-dimensional array within the inner cavity; and cooling the strength member and thermoplastic hotmelt material sufficiently to cause the thermoplastic hotmelt material to solidify around and encapsulate splice joints and stripped sections of the fusion spliced optical fibers.

In one embodiment of the disclosure, a multi-fiber splice protector is provided. The multi-fiber splice protector comprises a strength member that comprises at least one wall arranged in a tubular shape having a central axis extending in a longitudinal direction, wherein the strength member is bend-resistant, the at least one wall bounds an inner cavity extending in the longitudinal direction, and a longitudinal opening extends through an entire thickness of the at least one wall to permit passage of a coated optical fiber into the inner cavity. The multi-fiber splice protector further comprises a thermoplastic hotmelt material arranged within the inner cavity. The longitudinal opening comprises a first width extending in a direction transverse to the longitudinal direction, and the first width is greater than a diameter of one coated optical fiber but smaller than two times the diameter of one coated optical fiber. The inner cavity is configured to receive a plurality of coated optical fibers, the inner cavity comprises a second width extending in the direction transverse to the longitudinal direction, and the second width is at least two times greater (or at least three times greater, or at least four times greater, or at least five times greater) than the first width.

In accordance with another embodiment of the disclosure, a fiber optic cable assembly is provided. The fiber optic cable assembly comprises a first fiber optic cable section comprising a first plurality of optical fibers, and a second fiber optic cable section comprising a second plurality of optical fibers, wherein each optical fiber of the first and second pluralities of optical fibers includes a pre-coated section and a stripped section. The fiber optic cable assembly further comprises a plurality of fusion splices including a plurality of splice joints joining ends of the stripped sections of the first plurality of optical fibers with ends of the stripped sections of the second plurality of optical fibers to form a plurality of fusion spliced optical fibers. The fiber optic cable assembly additionally comprises a multi-fiber splice protector comprising a strength member including at least one wall arranged in a tubular shape having a central axis extending in a longitudinal direction, wherein the strength member is bend-resistant, the at least one wall bounds an inner cavity extending in the longitudinal direction, and a longitudinal opening extends through an entire thickness of the at least one wall to permit passage of a pre-coated section of a fusion spliced optical fiber of the plurality of fusion spliced optical fibers into the inner cavity. Additionally, fusion spliced optical fibers of the plurality of fusion spliced optical fibers are not exclusively arranged in a one-dimensional array within the inner cavity. Furthermore, a thermoplastic hotmelt material is present in the inner cavity of the strength member to encapsulate the plurality of fusion spliced optical fibers, including the plurality of splice joints as well as at least the stripped sections of the first and second pluralities of optical fibers. In certain embodiments, the longitudinal opening comprises a first width extending in a direction transverse to the longitudinal direction, and the first width is greater than a diameter of one pre-coated section of a fusion spliced optical fiber but smaller than two times the diameter of one pre-coated section of a fusion spliced optical fiber.

In accordance with another embodiment of the disclosure, a method for fabricating a fiber optic cable assembly is provided. The method comprises heating a strength member comprising at least one wall arranged in a tubular shape having a central axis extending in a longitudinal direction, wherein the at least one wall bounds an inner cavity extending in the longitudinal direction, a longitudinal opening extends through an entire thickness of the at least one wall, a thermoplastic hotmelt material is arranged within the inner cavity, the longitudinal opening comprises a first width extending in a direction transverse to the longitudinal direction; and the heating is sufficient to melt the thermoplastic hotmelt material. The method further comprises sequentially inserting individual fusion spliced optical fibers of a plurality of fusion spliced optical fibers through the longitudinal opening into the inner cavity, while manipulating the plurality of fusion spliced optical fibers to cause fusion spliced optical fibers of the plurality of fusion spliced optical fibers inserted into the inner cavity to not be exclusively arranged in a one-dimensional array within the inner cavity. The method additionally comprises permitting the strength member and the thermoplastic hotmelt material to cool sufficiently to cause the thermoplastic hotmelt material to solidify around and encapsulate splice joints and stripped sections of fusion spliced optical fibers of the plurality of fusion spliced optical fibers. In certain embodiments, the first width is greater than a diameter of one coated optical fiber but smaller than two times the diameter of one coated optical fiber.

Additional features and advantages will be set forth in the detailed description that follows, and in part will be readily apparent to those skilled in the technical field of optical connectivity. It is to be understood that the foregoing general description, the following detailed description, and the accompanying drawings are merely exemplary and intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the description serve to explain principles and operation of the various embodiments. Features and attributes associated with any of the embodiments shown or described may be applied to other embodiments shown, described, or appreciated based on this disclosure.

DETAILED DESCRIPTION

Figure 1:
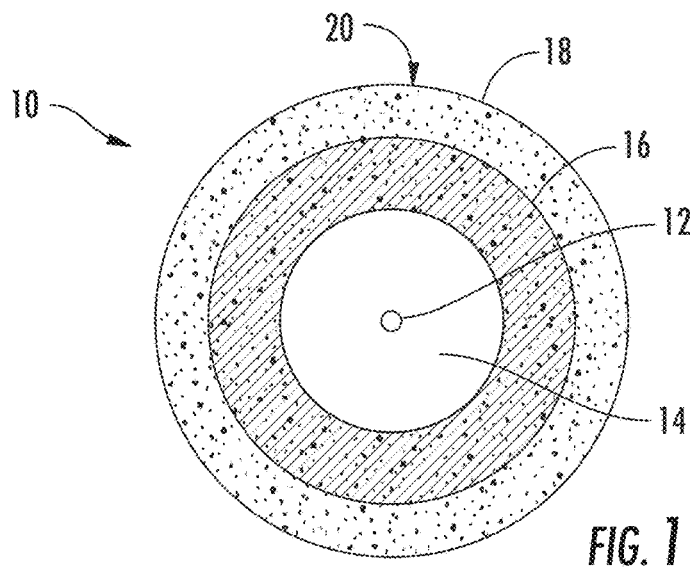
FIG. 1 is a cross-sectional view of a conventional coated optical fiber that may be subject to fusion splicing, prior to stripping of a multi-layer polymer coating from glass cladding.
Figure 2A:
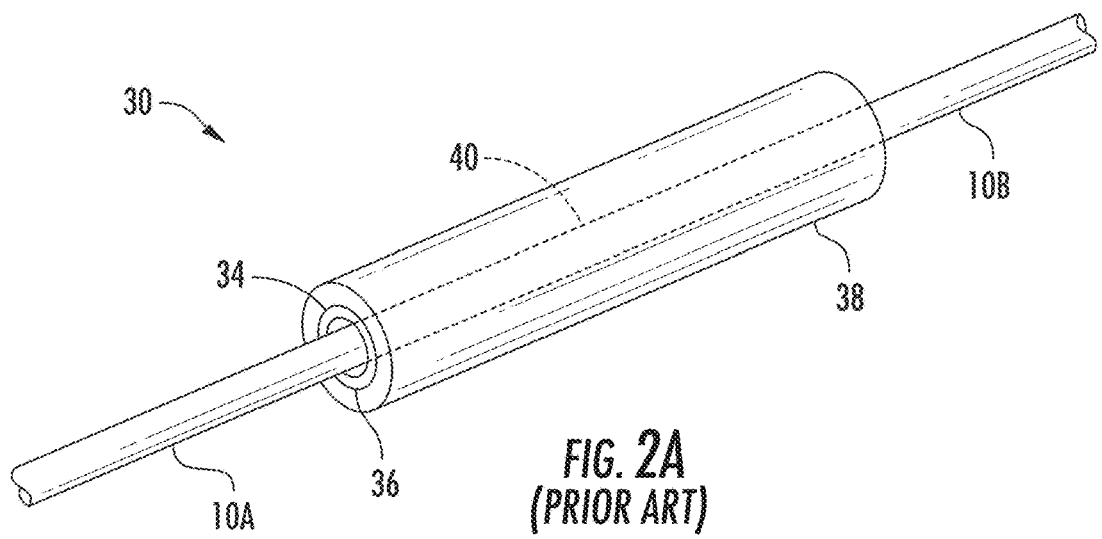
FIG. 2A is a schematic perspective view of a conventional heat shrink protection sleeve used to protect a splice joint between two optical fibers.
Figure 2B:
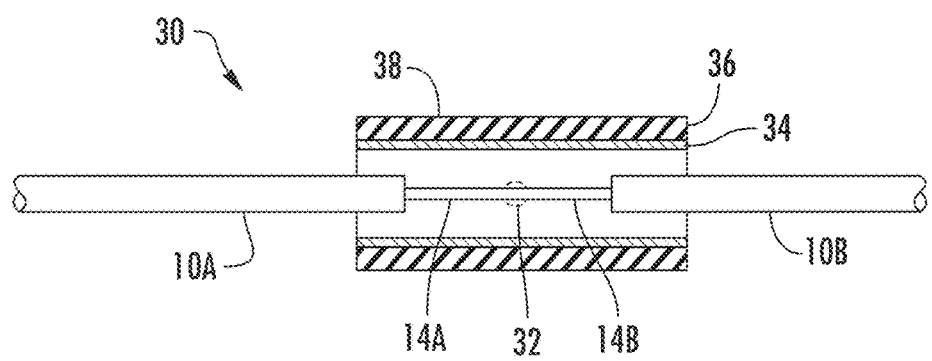
FIG. 2B is a schematic cross-sectional view of the heat shrink protection sleeve and optical fibers of FIG. 2A, with schematic illustration of the splice joint between stripped portions of the two optical fibers.
Figure 3:
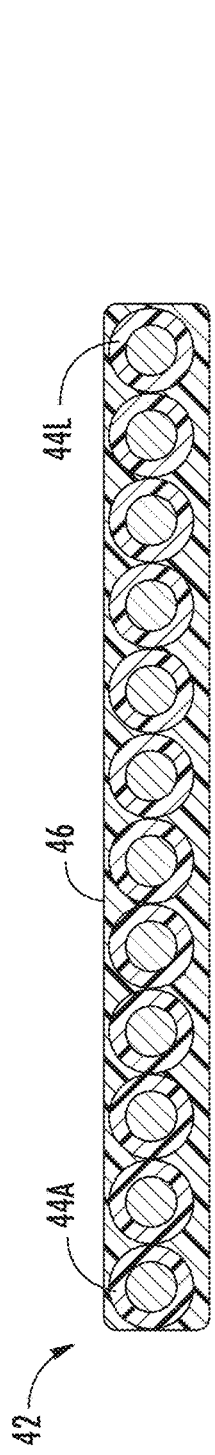
FIG. 3 is a cross-sectional view of a conventional optical fiber ribbon including twelve optical fibers.
Figure 4:
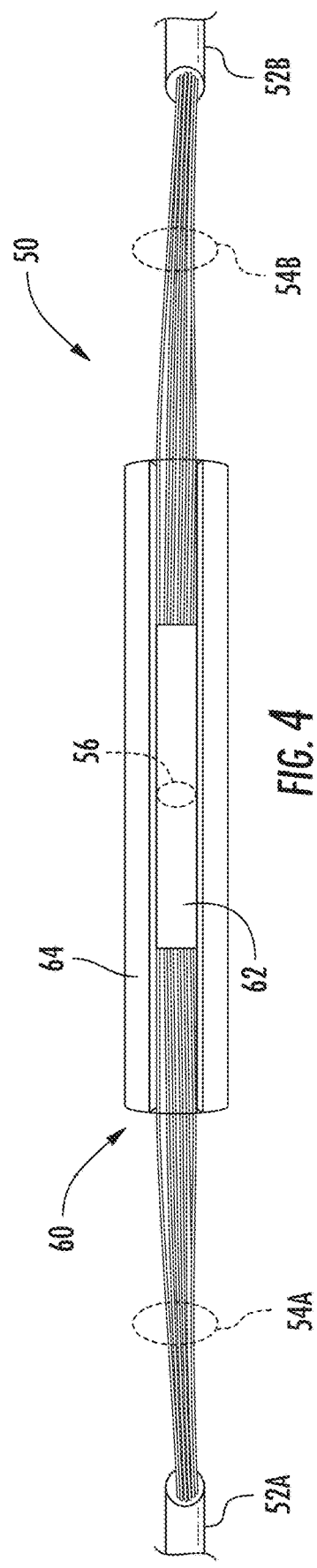
FIG. 4 is a side view of segments of two small round-type fiber optic cables from which twelve loose fibers extend, with the loose fibers being spliced in a one-dimensional array and protected by a conventional multi-fiber heat shrink protection sleeve.

Various embodiments will be further clarified by examples in the description below. In general, the description relates to a multi-fiber splice protector including a strength member and a thermoplastic hotmelt material arranged within an inner cavity of the strength member. The description further relates to a fiber optic cable assembly incorporating a multi-fiber splice protector as disclosed herein, and a method for fabricating a fiber optic cable assembly.

In this disclosure, the language "strength member," in the context of a multi-fiber splice protector, refers to a member having at least one wall arranged in a tubular shape that bounds an inner cavity extending in a longitudinal direction, with the at least one wall defining a longitudinal opening that permits passage of a coated optical fiber into the inner cavity. The longitudinal opening has a first width extending in a direction transverse to the longitudinal direction, and the first width is greater than a diameter of one coated optical fiber but smaller than two times the diameter of one coated optical fiber (or smaller than 2.5 times the diameter of one coated optical fiber in certain embodiments). The inner cavity comprises a second width extending in the direction transverse to the longitudinal direction, and the second width is significantly greater (e.g., at least two times, at least three times, at least four times, or at least five times greater) than the first width, to permit fusion spliced optical fibers to be not exclusively arranged in a one-dimensional array in the inner cavity.

In this disclosure, the language "fusion spliced optical fiber" refers to two optical fibers that have been fusion spliced together to form a permanent, optical link incorporating the two optical fibers. The singular noun "fusion spliced optical fiber" is used even though two optical fibers are initially present because, after fusion splicing, the resulting optical link is intended to function like a continuous optical fiber (even though there may be some attenuation resulting from the fusion splice joint (discussed below)). Using the singular form also facilitates discussions involving groups of these fusion spliced optical fibers, as will be apparent. A fusion spliced optical fiber may desirably include a polymeric overcoating over the fusion splice joint as well as over stripped portions of optical fibers proximate to the fusion splice joint.

Likewise, in this disclosure, the two optical fibers that define a given "fusion spliced optical fiber" may alternatively be referred to as "optical fiber segments." Using the language "optical fiber segments" rather than "optical fibers" helps clarify when the disclosure is referring to one of the pairs of optical fibers that form one of the fusion spliced optical fibers, versus one of the fusion spliced optical fibers itself.

In certain embodiments, a fiber optic cable assembly includes a plurality of fusion spliced optical fibers, with each spliced optical fiber including two optical fiber segments that are arranged serially and joined together by a splice (e.g., a fusion splice) to define a fusion splice joint. The fusion splice joints of the plurality of fusion spliced optical fibers define a fusion splice region of the fiber optic cable assembly. The fiber optic cable assembly may include a polymeric overcoating, in which polymeric material beneficially overcoats or encapsulates the fusion splice region and stripped sections of the optical fibers. The polymeric material may include or consist of a thermoplastic hotmelt material. In certain embodiments, the maximum width and height dimensions of the polymeric material are only slightly larger than maximum width and height dimensions of an array of pre-coated sections of the optical fibers proximate to the stripped sections. For example, in certain embodiments, the largest height and width portions of the polymeric material may correspond to areas in which the polymeric material overlaps the pre-coated (i.e., acrylate coated) sections of optical fibers. In certain embodiments, the polymeric material overlap region has a length of at least 1 mm, at least 3 mm, or another length specified herein. If the polymeric material has a thickness in such regions in a range of from 0.05 mm to 0.3 mm, then in certain embodiments, the greatest height and/or width portion of the polymeric material may exceed a greatest height and/or width portion of a corresponding array of pre-coated sections of optical fibers (proximate to the stripped sections of optical fibers) by dimensions in one of the following ranges: a range of from 0.1 mm to 0.6 mm, a range of from 0.2 mm to 0.6 mm, a range of from 0.1 mm to 0.5 mm, a range of from 0.2 mm to 0.5 mm, a range of from 0.2 mm to 0.4 mm, a range of from 0.2 mm to 0.3 mm, a range of from 0.3 mm to 0.6 mm, or a range of from 0.4 mm to 0.6 mm.

In certain embodiments, after fusion splicing, portions of the fusion spliced optical fibers proximate to a splice region may be coated (e.g., ribbonized) with thermoplastic hotmelt material (e.g., to an overall thickness of about 0.3 mm to 0.35 mm) Prior to insertion of fusion spliced optical fibers into a splice protector, portions of the thermoplastic hotmelt material forming the ribbon matrix material may be at least partially delaminated (e.g., by heating or peeling), leaving a length of less than 3 mm of ribbon matrix holding individual fusion spliced optical fibers together proximate to a splice region.

In certain embodiments, the following steps may be performed prior to sequential insertion of fusion spliced optical fibers through the longitudinal opening of a strength member into an inner cavity thereof: ribbonizing a first plurality of optical fibers emanating from a first fiber optic cable section using the thermoplastic hotmelt material to form a first ribbon matrix, wherein each optical fiber of the first plurality of optical fibers includes a pre-coated section and a stripped section; ribbonizing a second plurality of optical fibers emanating from a second fiber optic cable section using the thermoplastic hotmelt material to form a second ribbon matrix, wherein each optical fiber of the second plurality of optical fibers includes a pre-coated section and a stripped section; mass fusion splicing ends of the stripped sections of the first plurality of optical fibers with ends of the stripped sections of the second plurality of optical fibers to form the plurality of fusion spliced optical fibers; delaminating a portion of the first ribbon matrix proximate to transitions between the pre-coated sections and the stripped sections of the first plurality of optical fibers; and delaminating a portion of the second ribbon matrix proximate to transitions between the pre-coated sections and the stripped sections of the second plurality of optical fibers.

In certain embodiments, a splice protector has a length at least as long as the total length of stripped sections of optical fiber segments to be spliced. For mass fusion spliced optical fibers, the total length of a splice protector may be as short as about 20 mm. For individually spliced fibers, the total length of a splice protector may be as short as about 10 mm. While a short splice protector is desired to minimize the rigid length in a spliced cable, a longer splice protector improves the tensile strength of the protected splices.

Length, thickness, and material composition of a strength member can be optimized to confer a desired degree of bend resistance to a multi-fiber splice protector. One method for evaluating bend resistance of a multi-fiber splice protector as described herein is with a three point bending model, assuming that ends of the splice protector are supported (e.g., from below) and a force is applied to the middle of the multi-fiber splice protector in a direction (e.g., downward direction) opposing the support. In certain embodiments, a bend resistant multi-fiber splice protector can withstand such a force of at least one of the following values, with the splice protector arranged in any radial orientation and without deformation: at least 20 lbf, at least 50 lbf, at least 100 lbf, within a range of 20 lbf to 200 lbf, within a range of 20 lbf to 100 lbf, within a range of 50 lbf to 200 lbf, within a range of 50 lbf to 100 lbf, or within a range of 100 lbf to 200 lbf.

Figure 5:
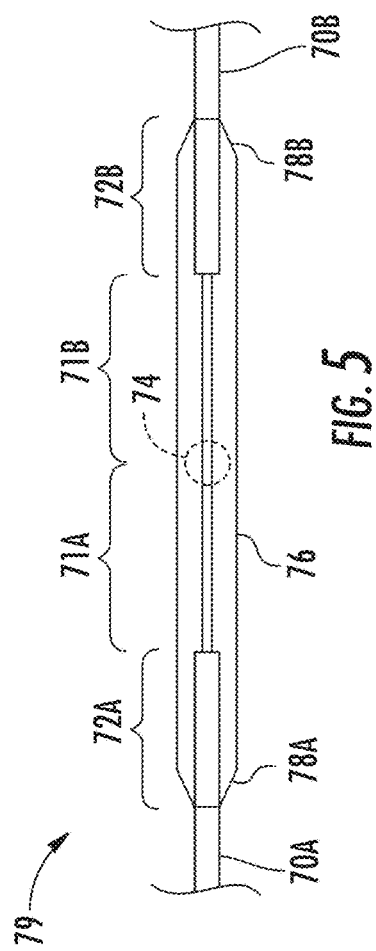
FIG. 5 is a side schematic view of an overcoated fusion spliced optical fiber.

FIG. 5 illustrates an overcoated fusion spliced optical fiber 79, composed of optical fiber segments 70A, 70B and a solid overcoating 76 of thermoplastic hotmelt material having a substantially constant outer diameter over the majority of its length. Each optical fiber segment 70A, 70B includes a coating (e.g., an acrylate coating), with portions of each optical fiber segment 70A, 70B being previously stripped of such coating to form stripped sections 71A, 71B embodying glass cladding. Ends of the stripped sections 71A, 71B are fusion spliced at a splice joint 74 to form a fusion spliced optical fiber. The solid overcoating 76 of thermoplastic hotmelt material extends over the splice joint 74, the previously stripped sections 71A, 71B, and short lengths 72A, 72B of the coated optical fiber segments 70A, 70B. As shown in FIG. 5, the solid overcoating 76 may include tapered thickness ends 78A, 78B, with a remainder of the solid overcoating 76 having a substantially constant outer diameter that exceeds an outer diameter of the coated optical fiber segments 70A, 70B. The coated optical fiber segments 70A, 70B may each have a nominal outer diameter of 0.25 mm (250 µm) in some embodiments. In certain embodiments, the solid overcoating 76 of thermoplastic hotmelt material may include an outer diameter in a range of from 0.2 mm to 0.9 mm, from 0.2 mm to 0.7 mm, from 0.2 mm to 0.5 mm, from 0.25 mm to 0.9 mm, from 0.25 mm to 0.7 mm, or from 0.25 mm to 0.5 mm.

Although only a single overcoated fusion spliced optical fiber 79 is shown in FIG. 5, it is to be appreciated that a solid overcoating similar to the solid overcoating 76 shown in FIG. 5 may be applied to multiple fusion spliced optical fibers arranged in a one-dimensional array. In such a situation, the above-described outer diameter values for solid overcoating of thermoplastic hotmelt material may correspond to thickness values for the solid overcoating applied to an array of fusion spliced optical fibers.

A thermoplastic hotmelt material useable to overcoat fusion spliced optical fibers comprises a thermoplastic material that may be heated to a flowable state. In certain embodiments, fusion spliced optical fibers may be temporarily placed in a cavity (e.g., a mold cavity), a housing, a trough, or a container in which thermoplastic hotmelt material in a flowable state is present, or to which such thermoplastic hotmelt material in a flowable state is supplied. In certain embodiments, fusion spliced optical fibers may be dipped into (or otherwise contacted with) a pool of molten thermoplastic material to effectuate coating. In certain embodiments, a polymeric material that may be used to overcoat portions of fusion spliced optical fibers may include a melt-flow thermoplastic adhesive material. Examples of thermoplastic hotmelt materials that may be used in certain embodiments include, but are not limited to ethylene vinyl acetate (EVA), polyurethanes, and polyamides.

To avoid thermal degradation of one or more acrylate coating layers of the pre-coated sections of the fusion spliced optical fibers, molten thermoplastic material to be used for overcoating should be maintained at a processing temperature below a melt temperature of the one or more acrylate coating layers. To promote formation of a suitable overcoating, the molten thermoplastic material may also be maintained at a processing temperature at which the molten thermoplastic material has a melt viscosity in a range of from about 100 centipoises (cps) to about 10,000 cps, or more preferably in a subrange of from about 1,000 cps to about 10,000 cps, or more preferably in a subrange of from about 2,000 cps to about 4,000 cps.

In certain embodiments, desirable thermoplastic hotmelt and/or overcoating materials differ from conventional melt-flow adhesive glue sticks or typical thermoplastic materials in that they desirably: have a medium viscosity (e.g., according to one or more of the ranges outlined above) at a processing temperature; are chemically stable at the processing temperature, have a glass transition temperature of no greater than −40° C.; have a service temperature spanning at least a range of from −40° C. to 85° C. without suffering significant mechanical and/or optical performance degradation; exhibit strong adhesion to fiber coating layers and bare glass; are free from charring; and/or exhibit minimal to no outgassing (e.g., of volatile organic compounds and/or other constituents). A glass transition temperature is the point at which a material goes from a hard brittle state to a flexible or soft rubbery state as temperature is increased. A common method for determining glass transition temperature uses the energy release on heating in differential scanning calorimetry. If a plastic (e.g., thermoplastic) material associated with an optical fiber is exposed to a temperature below its glass transition temperature, then the material will become very hard, and the optical fiber may be susceptible to micro bend losses. In certain embodiments, service temperature of a thermoplastic overcoating material may be determined by compliance with one or more industry standards for telecommunication fiber reliability testing, such as (but not limited to): ITU-T G.652, IED60793-2, Telcordia GR-20-CORE and TIA/EIA-492.

In certain embodiments, a thermoplastic hotmelt material and/or a thermoplastic overcoating useable with embodiments disclosed herein has a heat resistance temperature of at least 100° C., a melting temperature of less than 240° C., and a melt viscosity of less than 10,000 cps. In certain embodiments, a thermoplastic hotmelt material may comprise a melt-flow thermoplastic adhesive material, such as TECHNOMELT® PA 6208 polyamide material (Henkel Corp., Dusseldorf, Germany). Such material exhibits a heat resistance temperature greater than 90° C., a melt-flow temperature lower than 260° C., a melt viscosity between 100 cps and 10,000 cps, and a hardness of at least Shore A 45. Further details regarding thermoplastic overcoating of fusion spliced optical fibers and/or portions of fiber optic cable assemblies are disclosed in U.S. Patent Application Publication No. 2020/0012047A1 published on Jan. 9, 2020, wherein the content of the foregoing publication is hereby incorporated by reference herein.

In certain embodiments, a thermoplastic hotmelt material useable with multi-fiber splice protectors disclosed herein may include PA682 hotmelt adhesive commercially available from Henkel.

Formation of a solid thermoplastic overcoating over at least a short distance of pre-coated sections of optical fibers bounding a spliced segment (e.g., at either end of stripped sections joined at a splice joint) beneficially ensures that all previously stripped (glass) sections are fully overcoated. In certain embodiments, a solid thermoplastic overcoating extends over a length of a pre-coated section of each of the first and second optical fibers, wherein the overcoated length of each pre-coated section is in a range of from about 1 mm to about 10 mm. Additionally, since the solid thermoplastic overcoating may adhere to one or more coating layers of an optical fiber more readily than to (pre-stripped) exposed glass sections, providing a solid thermoplastic overcoating of sufficient length to overlap at least a short distance of pre-coated sections of optical fibers bounding a spliced segment promotes more secure adhesion between the solid thermoplastic overcoating and the fusion spliced segment as a whole. In certain embodiments, a solid thermoplastic overcoating and a fusion spliced segment utilize a thermoplastic material that is devoid of additives configured to promote adhesion to glass, such as silane. A solid thermoplastic overcoating as disclosed herein is preferably not subject to delamination during normal handling over the required service conditions and lifetime of a fiber optic cable.

In preferred embodiments, a solid thermoplastic overcoating is water-resistant and serves to block moisture from reaching the splice joint and the previously stripped glass region of a fusion spliced segment of optical fibers. This is beneficial since moisture is known to chemically interact with glass cladding of optical fibers and cause expansion of micro defects in the glass, thereby leading to long-term failure of optical fibers. The solid thermoplastic overcoating is preferably also devoid of sharp particles (e.g., inorganic filler particles) and air bubbles. The solid thermoplastic overcoating may also be devoid of a UV curable material. In certain embodiments, formation of air bubbles may be reduced by contacting stripped sections and pre-coated sections of fusion spliced first and second optical fibers with molten thermoplastic material in a subatmospheric pressure environment (e.g., in a range of from 0.01 to 0.9, or 0.1 to 0.8, or 0.1 to 0.7 times local atmospheric pressure), such as may be attained in a partially evacuated chamber or other enclosure.

In certain embodiments, portions of fusion spliced optical fibers may be overcoated with thermoplastic hotmelt material prior to insertion of the optical fibers into a strength member (i.e., through a longitudinal opening of the strength member into an inner cavity thereof). This initial overcoating may effectively ribbonize (or re-ribbonize) previously stripped portions of multiple fusion spliced optical fibers, thereby aiding in handling the optical fibers prior to and during insertion into a strength member. The initial overcoating may also prevent the potential formation of voids within the inner cavity of a strength member, depending on factors such as the amount and condition of thermoplastic hotmelt material present within the inner cavity and/or the manipulation of fusion spliced optical fibers during insertion into the inner cavity.

In certain embodiments, the thermoplastic hotmelt material with which the fusion spliced optical fibers are overcoated is compositionally the same as (or substantially similar to) thermoplastic hotmelt material initially present within the inner cavity of the strength member (i.e., prior to insertion of optical fibers through the longitudinal opening). Compositional matching between the overcoating material and the thermoplastic hotmelt material initially present within the inner cavity permits the respective materials (upon heating) to assimilate without a dissimilar material boundary after fusion spliced optical fibers are inserted through a longitudinal opening into the inner cavity of a strength member to form a cable assembly including a multi-fiber splice protector.

In certain embodiments, pre-coated (i.e., acrylate coated) optical fibers subject to being fusion bonded and overcoated (or encapsulated) according to methods disclosed herein are prepared for fusion bonding (e.g., by stripping ends thereof) utilizing non-contact fiber stripping methods and/or apparatuses, such as those disclosed in U.S. Pat. No. 9,167,626 B2 ("the '626 Patent"), which is hereby incorporated by reference. Briefly, the '626 Patent discloses use of a heater configured for heating a heating region to a temperature above a thermal decomposition temperature of at least one coating of an optical fiber, a securing mechanism for securely positioning a lengthwise section of the optical fiber in the heating region, and a controller operatively associated with the heater and configured to deactivate the heater no later than immediately after removal of the at least one coating from the optical fiber. Thermal decomposition of at least one coating of an optical fiber reduces or minimizes formation of flaws in optical fibers that may be generated by mechanical stripping methods and that can reduce their tensile strength.

In certain embodiments, unjacketed optical fiber segments emanating from the same jacket may be initially loose, but subsequently ribbonized to provide consistent spacing between fibers to facilitate utilization of a mass fusion splicing process for forming multiple splice joints between multiple pairs of optical fibers in a substantially simultaneous manner. To fabricate an optical fiber ribbon, optical fibers of an unjacketed segment may be contacted with at least one polymeric material (e.g., thermoplastic hotmelt material) in a flowable state, and the at least one polymeric material may be solidified. When optical fiber ribbons are used, mass fusion splicing may be performed between ends of optical fibers of a first optical fiber ribbon and ends of optical fibers of a second optical fiber ribbon.

Optical fibers of a first plurality of optical fiber segments and of a second plurality of optical fiber segments to be fusion bonded may be arranged in first and second conventional fiber sorting fixtures, respectively, during stripping and/or fusion bonding steps. A typical fiber sorting fixture includes a slot having an opening dimension (e.g., height) that closely matches a corresponding dimension of unbuffered, coated optical fibers to maintain portions of the optical fibers proximate to ends to be stripped (and subsequently fusion spliced) in fixed, substantially parallel positions embodying a one-dimensional array. In certain embodiments, coated optical fibers having outer diameters of either 200 μm or 250 μm may laterally abut one another in a fiber sorting fixture, such that cores of adjacent optical fibers are also spaced either 200 μm or 250 μm apart. After stripping of acrylate coating material from end sections (to form stripped sections) of the optical fibers, the remaining (bare glass) cladding and core portions are in a non-contacting (and non-crossing) relationship, and bare glass ends of the optical fibers may be fusion bonded using conventional fusion bonding method steps known to those skilled in the art. Mass fusion bonding may be used in any embodiments disclosed herein. Variations of the techniques disclosed in the '626 Patent are disclosed in U.S. Pat. Nos. 10,018,782 and 9,604,261, the disclosures of which are also hereby incorporated by reference herein. Non-contact stripping methods using lasers or hot gases are also possible in certain embodiments.

As noted previously, a strength member of a multi-fiber splice protector as disclosed has at least one wall arranged in a tubular shape with a longitudinal opening (e.g., a slot) extending through an entire thickness of the at least one wall to permit passage of a coated optical fiber into an inner cavity of the splice protector. In certain embodiments, a strength member comprises a single wall that is bent into a curved (e.g., cylindrical or oval) cross-sectional shape. In certain embodiments, an exterior of a strength member comprises a generally cylindrical shape, and the inner cavity of a strength member also comprises a generally cylindrical shape. In certain embodiments, an exterior and/or an inner cavity of a strength member may comprise a cross-sectional profile that is polygonal (e.g., triangular, square, pentagonal, hexagonal, heptagonal, octagonal, etc.) or rounded polygonal in shape. In other certain embodiments, the strength member of the splice protector comprises a single wall that is formed into a U-shaped structure. In certain embodiments, the wall thickness of the strength member of the splice protector may be less than 2 mm or less than 1 mm. In certain embodiments, the wall thickness of the strength member of the splice protector is 0.7 mm. In certain other embodiments, the strength member of the splice protector is U-shaped and is formed from a sheet metal with a wall thickness of 0.15 mm and an inner cavity thickness of 0.40 mm. As can be appreciated, a tubular shape can have different cross-sectional profiles depending on the embodiment. In this disclosure, "tubular shape" merely refers to a shape that is generally elongate (i.e., longer than wide) and has an inner cavity. In certain embodiments, such a shape may have a cross-sectional profile of any suitable configuration, such as round, oval, square, polygonal, etc.

Various materials and fabrication techniques may be used to produce strength members as disclosed herein. In certain embodiments, at least one wall of a strength member as disclosed herein may comprise glass, metal, ceramic, and/or composite materials. Depending on the material(s) used, strength members may be fabricated by injection molding, extrusion, machining, rolling, bending, stamping, pressing, sintering or the like, optionally combined with one or more heating and/or cooling steps. In certain embodiments, a strength member may comprise a metal (e.g., stainless steel—300 series stainless steel, 400 series stainless steel, etc.) slotted roll pin, of which various sizes are commercially available. In certain embodiments, strength member resembling a slotted roll pin (or similar shape) may be fabricated of non-metals such as thin glass, ceramics, or glass ceramics. In certain embodiments, a longitudinal opening defined in a strength member may have a substantially constant width regardless of wall depth position (e.g., with respect to distance from a longitudinal axis extending through a strength member). In certain embodiments, a longitudinal opening defined in a strength member may have a width that varies with wall depth position, such as a width that is larger closer to an outer surface of a strength member, and that is smaller closer to an inner cavity of a strength member. In certain embodiments, a longitudinal opening may be defined in a wall of tubing by dicing through a wall of the tubing.

While a 1.1 mm diameter inner cavity can accommodate 12 spliced optical fibers, a 1.5 mm diameter inner cavity can accommodate 24 spliced optical fibers. In certain embodiments, a strength member has an outer diameter of no greater than one of the following threshold widths: about 5 mm; about 4 mm; about 3 mm; about 2.5 mm; or about 2 mm. A strength member as disclosed herein is scalable to receive any suitable number of optical fibers with appropriate dimensional adjustments (e.g., 1 fiber, 2 fibers, 4 fibers, 6 fibers, 8 fibers, 16 fibers, 24 fibers, 48 fibers, 96 fibers, 144 fibers, or more) by adjusting dimensions, including a diameter of the inner cavity.

Following fabrication of a strength member, thermoplastic hotmelt material may be loaded into an inner cavity of a strength member using any suitable methods. Such methods may include: injecting/dispensing molten thermoplastic hotmelt material through the longitudinal opening and/or open ends of the strength member; pressing a length of solid thermoplastic hotmelt material into one or more open ends of the strength member into the internal cavity; combinations of the foregoing; or any other suitable method. In certain embodiments, the splice protector is U-shaped, and the thermoplastic hotmelt material occupies a portion of the inner cavity volume. In certain other embodiments, the thermoplastic hotmelt material occupies a portion of the inner cavity volume and extends beyond the longitudinal opening of the strength member of the splice protector, wherein upon insertion of the optical fiber(s) or optical fiber ribbon into the inner cavity of the strength member and the thermoplastic hotmelt material, the thermoplastic hotmelt material encloses the optical fiber(s) or optical fiber ribbons and fills the entire volume of the inner cavity as discussed herein.

Figure 6:
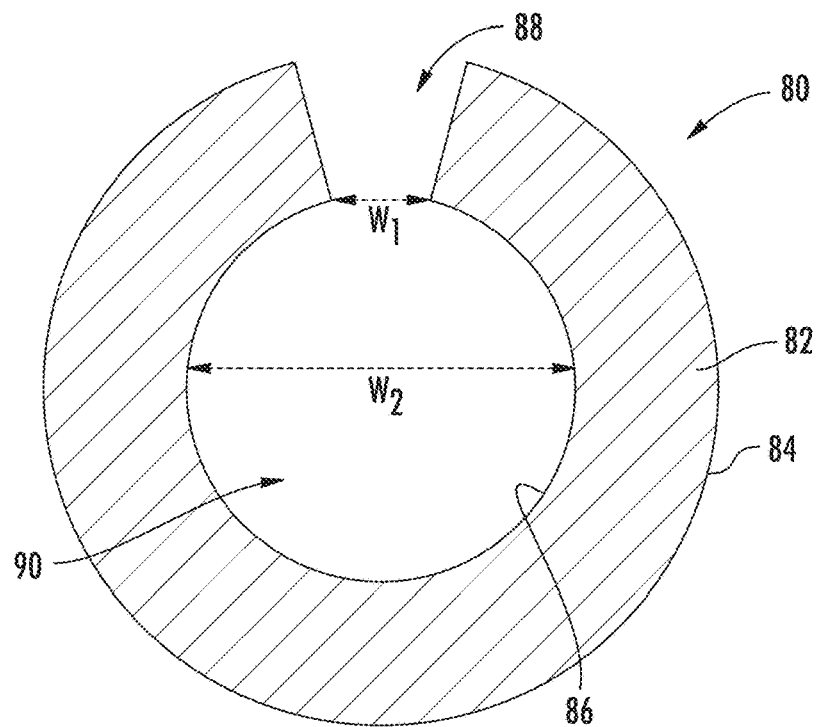
FIG. 6 is a schematic cross-sectional view of a strength member of a multi-fiber splice protector according to one embodiment of the disclosure.

FIG. 6 is a schematic cross-sectional view of a strength member 80 of a multi-fiber splice protector according to one embodiment of the disclosure. The strength member 80 comprises a wall 82 that is bent into a substantially cylindrical shape that defines a longitudinal opening 88. The wall 82 has an outer surface 84 and an inner surface 86, with the inner surface 86 bounding an inner cavity 90 that also has a substantially cylindrical shape. In certain embodiments, the outer surface 84 may include a layer of non-stick coating (e.g., PTFE spray coating) to prevent adhesion of the strength member 80 or splice protector 98 (FIG. 7) to the heating apparatus 100 (FIG. 10A) as discussed below. The longitudinal opening 88 has a non-uniform width that is larger proximate to the outer surface 84 of the wall 82 and is smaller proximate to the inner surface 86 of the wall 82. A minimum width of the longitudinal opening 88 may be termed a first width $W_1$, and a maximum width of the inner cavity 90 may be termed a second width $W_2$. The first width $W_1$ is preferably greater than a diameter of one coated optical fiber but smaller than two times the diameter of one coated optical fiber, so that the longitudinal opening 88 may permit the sequential passage of one coated optical fiber at a time into the inner cavity 90. The second width $W_2$ is significantly greater (e.g., at least two times, at least three times, at least four times, or at least five times greater) than the first width $W_1$, to permit fusion spliced optical fibers to be not exclusively arranged in a one-dimensional array in the inner cavity 90. In certain embodiments, the first width $W_1$ is preferably greater than a diameter of one coated optical fiber but smaller than 2.5 times the diameter of one coated optical fiber.

Figure 7:
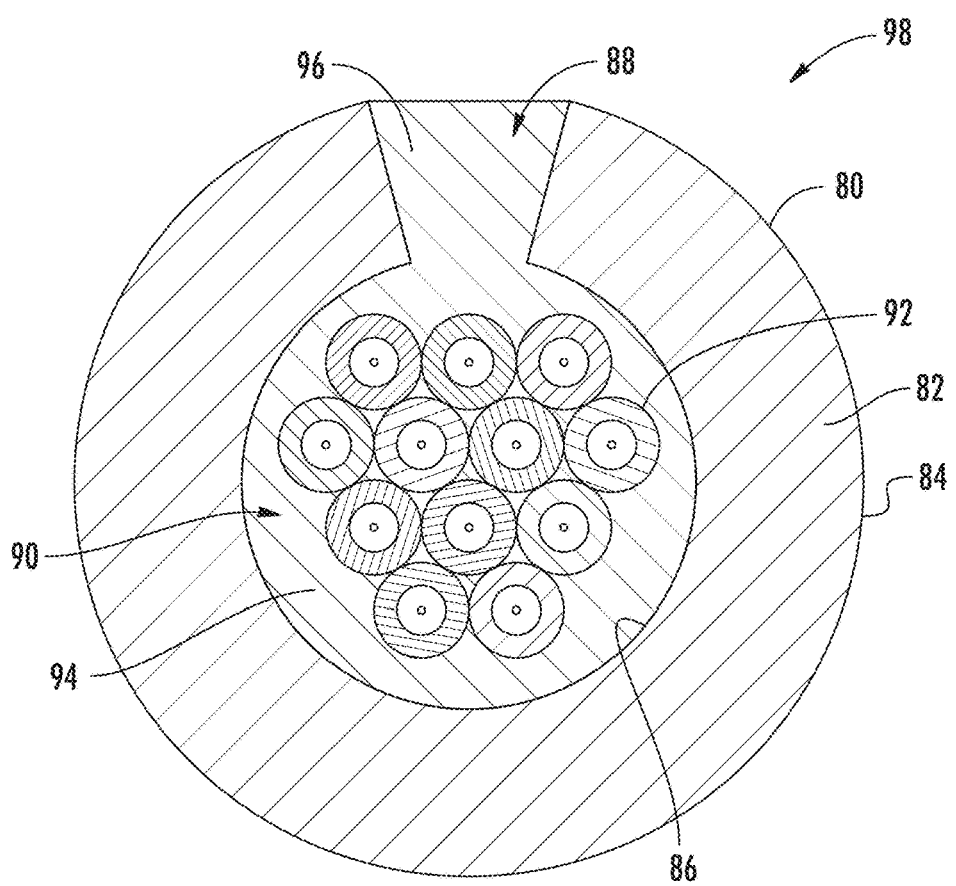
FIG. 7 is a schematic cross-sectional view of twelve fusion spliced optical fibers arranged within an inner cavity of a strength member and encapsulated in thermoplastic hotmelt material of a multi-fiber splice protector.

FIG. 7 is a schematic cross-sectional view of a group 92 of twelve fusion spliced optical fibers arranged within the inner cavity 90 of the strength member 80 (according to FIG. 6) and encapsulated in thermoplastic hotmelt material 94 of a multi-fiber splice protector 98. The strength member 80 comprises a wall 82 that is bent into a substantially cylindrical shape that defines the longitudinal opening 88. The inner surface 86 of the wall 82 bounds the inner cavity 90, with the outer surface 84 opposing the inner surface. An extension portion 96 of thermoplastic hotmelt material is present within the longitudinal opening 88, with the extension portion 96 being continuous with the thermoplastic hotmelt material 94 present in the inner cavity 90. As shown, the group 92 of fusion spliced optical fibers are present within the inner cavity 90 in a close-packed (e.g., hexagonally close-packed) formation having a maximum width equal to the sum of the widths of four coated optical fibers, with thermoplastic hotmelt material 94 encapsulating the group 92 of fusion spliced optical fibers. Additionally, a minimum width of the longitudinal opening 88 is greater than the width of a single coated optical fiber of the group 92 of fusion spliced optical fibers, but smaller than the width of two coated optical fibers of the group 92 of fusion spliced optical fibers.

Figure 8:
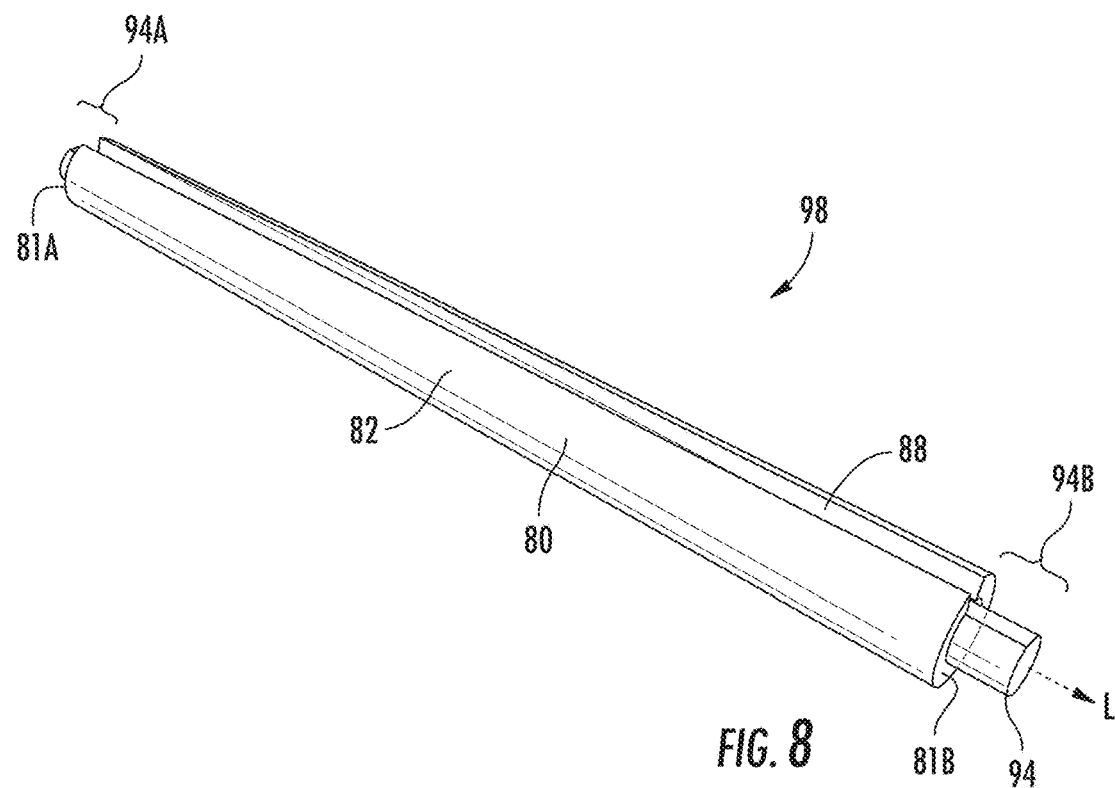
FIG. 8 is a schematic perspective view of a multi-fiber splice protector including a generally tubular strength member with thermoplastic hotmelt material extending from an inner cavity and beyond ends of the strength member.

FIG. 8 is a schematic perspective view of the multi-fiber splice protector 98 including the strength member 80 of FIG. 6 containing thermoplastic hotmelt material 94 in an inner cavity of the strength member 80, and with end portions 94A, 94B of the thermoplastic hotmelt material 94 extending in a direction parallel to a longitudinal axis L and beyond first and second ends 81A, 81B of the strength member 80. In certain embodiments, each end portion 94A, 94B extend beyond the corresponding first and second ends 81A, 81B by at least 1 mm to provide strain relief to optical fibers portions extending beyond the strength member 80. The longitudinal opening 88 defined through the wall 82 of the strength member 80 is not filled with thermoplastic hotmelt material.

Figure 9A:
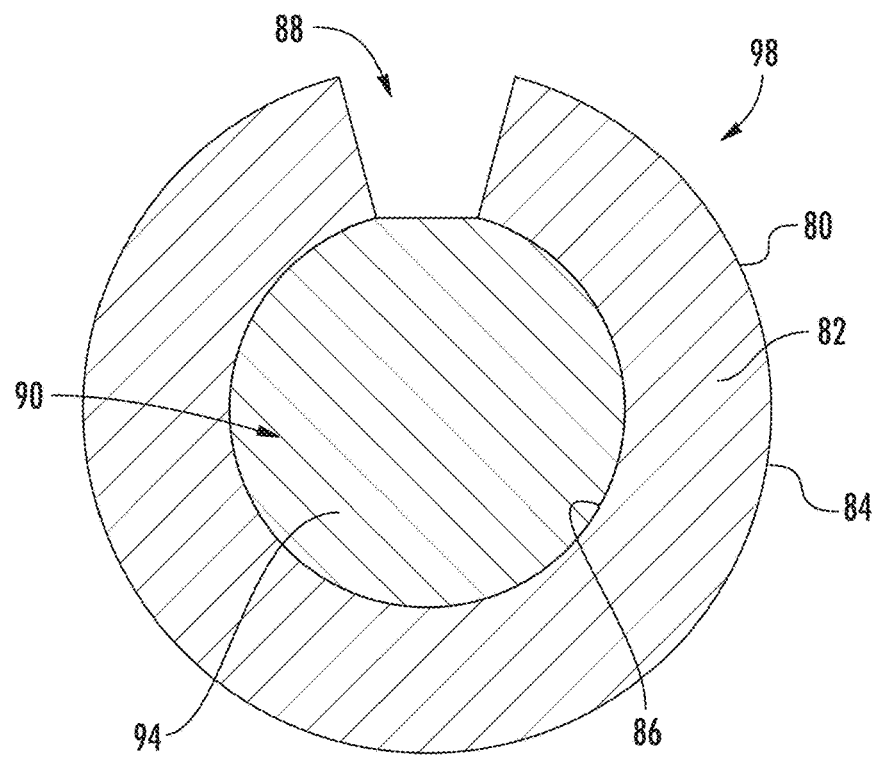
FIG. 9A is a schematic cross-sectional view of a multi-fiber splice protector according to one embodiment, including a generally tubular strength member with thermoplastic hotmelt material filling substantially an entirety of the inner cavity of the strength member but not extending into a longitudinal opening of the strength member.

FIG. 9A is a schematic cross-sectional view of the multi-fiber splice protector 98 according to one embodiment corresponding to that shown in FIG. 8, in which the generally tubular strength member 80 includes the wall 82 defining the inner cavity 90, with thermoplastic hotmelt material 94 filling substantially an entirety of the inner cavity 90 but not extending into a longitudinal opening 88 of the strength member 80. The inner surface 86 of the strength member bounds the inner cavity 90, wherein each of the strength member 80 and the inner cavity 90 has a substantially cylindrical shape.

Figure 9B:
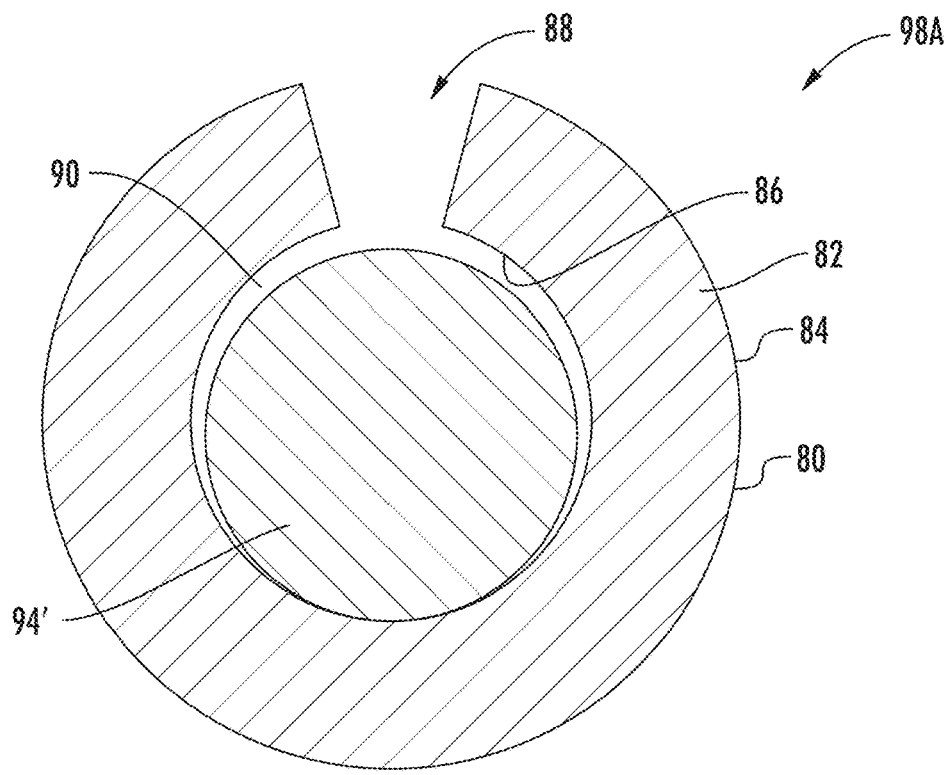
FIG. 9B is a schematic cross-sectional view of a multi-fiber splice protector according to one embodiment, including a generally tubular strength member with thermoplastic hotmelt material filling less than an entirety of the inner cavity of the strength member and not extending into a longitudinal opening of the strength member.

FIG. 9B is a schematic cross-sectional view of a multi-fiber splice protector 98A according to one embodiment substantially similar to that shown in FIG. 9A, but with thermoplastic hotmelt material 94' filling less than an entirety of the inner cavity 90 and not extending into a longitudinal opening 88 of the strength member 80. The remaining elements of the multi-fiber splice protector 98A are identical to those shown and described in connection with the multi-fiber splice protector 98 of FIG. 9A. As mentioned previously, in certain embodiments, the splice protector is U-shaped, and the thermoplastic hotmelt material occupies a portion of the inner cavity volume. In certain other embodiments, the thermoplastic hotmelt material occupies a portion of the inner cavity volume and extends beyond the longitudinal opening of the strength member of the splice protector, wherein upon insertion of the optical fiber(s) or optical fiber ribbon into the inner cavity of the strength member and the thermoplastic hotmelt material, the thermoplastic hotmelt material encloses the optical fiber(s) or optical fiber ribbons and fills the entire volume of the inner cavity.

Either of the multi-fiber splice protectors 98, 98A of FIGS. 8, 9A, and 9B may be readied for protecting fusion spliced optical fibers by heating the multi-fiber splice protector 98, 98A sufficiently to cause the thermoplastic hotmelt material 94 to be in a flowable state, so that fusion spliced optical fibers inserted through the longitudinal opening 88 into the inner cavity 90 may be encapsulated within the thermoplastic hotmelt material 94, 94'. Upon insertion of fusion spliced optical fibers into the inner cavity 90 with the thermoplastic hotmelt material 94, 94' in a flowable (e.g., molten) state, a portion of the thermoplastic hotmelt material 94, 94' may be displaced into or through the longitudinal opening 88 and/or ends 81A, 81B (as shown in FIG. 8) of the strength member 80. The amount of thermoplastic hotmelt material 94 to be displaced will depend on factors such as the volume of fusion spliced optical fibers inserted into the inner cavity 90, the volume of thermoplastic hotmelt material 94, 94' originally present in the inner cavity 90, and the volume of any overcoating material (e.g., thermoplastic hotmelt overcoating material) that may be present on the fusion spliced optical fibers at the time the fusion spliced optical fibers are inserted into the inner cavity 90. These factors may be adjusted to ensure that fusion spliced optical fibers within the inner cavity 90 are fully encapsulated by the thermoplastic hotmelt material 94, 94' and provide a desired degree of filling of the inner cavity 90 and/or displacement of thermoplastic hotmelt material 94 from the longitudinal opening 88 and/or ends of the strength member 80. Excessive outflow of thermoplastic hotmelt material 94, 94' from the inner cavity 90 may be prevented by controlling temperature of the thermoplastic hotmelt material 94, 94' so that surface tension between the thermoplastic hotmelt material 94, 94' and surfaces of the strength member 80 will retain the thermoplastic hotmelt material 94, 94' in contact with the strength member 80. In certain embodiments, the thermoplastic hotmelt material fills 85% to 100% of a volume of the inner cavity 90 of the strength member 80 prior to insertion of at least one coated optical fiber into the inner cavity 90.

In an alternate embodiment, splice protector 98 may comprise a U-shaped strength member 80. A method of manufacturing a splice protector 98 with a U-shaped strength member 80 is discussed below. A U-shaped strength member 80 can be formed by a metal stamping process. In some embodiments, the metal stamping process yields a U-shaped strength member 80 with flared ends (i.e., longitudinal sides of the strength member 80 are not substantially parallel to each other). In other embodiments, a shim on both sides of the strength member 80 may be used to press the sides, creating substantially parallel longitudinal sides and setting the height of the inner cavity 90.

A hot melt adhesive (described herein) fills inner cavity 90 of U-shaped strength member 80 via low pressure molding or injection molding in some embodiments. The mold used includes a top half, a symmetric bottom half, an inlet or multiple inlets (depending on the operating pressure of the mold during use), flow channels embedded in the top half and the bottom half, and one or more outlets (depending on the operating pressure of the mold during use). The top half of the mold has halves of the flow channels that correspond to those in the bottom half of the mold such that when the top half of the mold is coupled to the bottom half of the mold, strength members 80 are seated within the flow channels formed (by the top half and the bottom half of the mold). In some embodiments, adjacent flow channels are connected by 180 degree turns.

U-shaped strength members 80 are positioned within the flow channels in the bottom half of the mold, and an exposed surface of the U-shaped strength members 80 (when seated in the flow channel) is sprayed with a non-stick coating (e.g., PTFE, etc.). The opposite surface of the U-shaped strength members 80 is sprayed with non-stick coating by flipping and seating the strength member 80 into the corresponding flow channel of the opposite half of the mold (i.e., top half)

and applying the non-stick coating to the opposite, exposed surface. In an alternate embodiment, the non-stick coating is applied to the surface of the strength member 80 prior to seating the strength member 80 within the flow channels.

As mentioned previously, a hot melt adhesive is supplied to inner cavity 90 of strength member 80 using the mold previously described. Such a mold and corresponding process enables batch filling at least one hundred splice protectors 98 at a time. In one embodiment, the mold can fill two hundred ten splice protectors 98. As such, the mold and corresponding process described herein provides a short cycle time and high throughput in producing low profile splice protectors 98. After preparing splice protectors 98 as discussed above, splice protectors 98 can be individually packaged with an air tight bag, or collectively packaged in an air-tight enclosure.

Figure 10A:
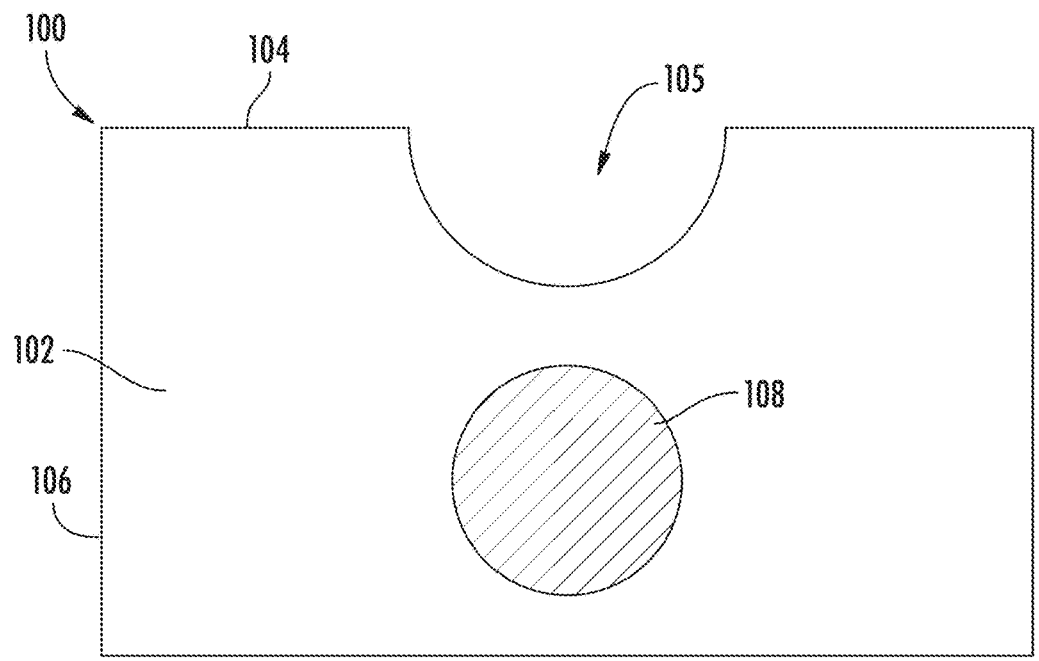
FIG. 10A is a cross-sectional view of a heating apparatus comprising a recess for receiving a portion of a multi-fiber splice protector and comprising a heating element suitable for heating a multi-fiber splice protector when received within the recess.

FIG. 10A is a cross-sectional view of a heating apparatus 100 comprising a recess 105 suitable for receiving a portion of a multi-fiber splice protector, with the heating apparatus 100 comprising a heating element 108 suitable for heating a multi-fiber splice protector when received within the recess 105. The heating apparatus 100 may be compact and suitable for operation in the field proximate to an optical fiber installation location. The heating apparatus 100 includes a body 102 that has an upper surface 104 and side surfaces 106, and that contains the heating element 108, which may be an internal electric cartridge heater. The recess 105 is recessed relative to the upper surface 104. The body 102 may be formed of a thermally conductive material such as a metal (e.g., aluminum, copper, steel, etc.), and one or more surfaces 104, 106 of the heating apparatus 100 may be treated (e.g., anodized) and/or coated to prevent or reduce adhesion of any thermoplastic hotmelt material that may come into contact therewith. In certain embodiments, the recess 105 may comprise a size and cross-sectional shape that corresponds to and is configured to receive at least a portion (e.g., a lower half) of a strength member of a multi-fiber splice protector as disclosed herein. In certain embodiments, the recess 105 may be sized and shaped to contact at least 40%, at least 45%, at least 49%, or about 50% of an external surface area of a strength member of a multi-fiber splice protector. In certain embodiments, recess 105 has a depth that is greater than the wall thickness of the strength member of the splice protector. In certain embodiments, a recess 105 may comprise a semi-cylindrical shape, but the heating apparatus may comprise recesses of other shapes depending on the shape of the strength member of a multi-fiber splice protector to be received therein.

Figure 10B:
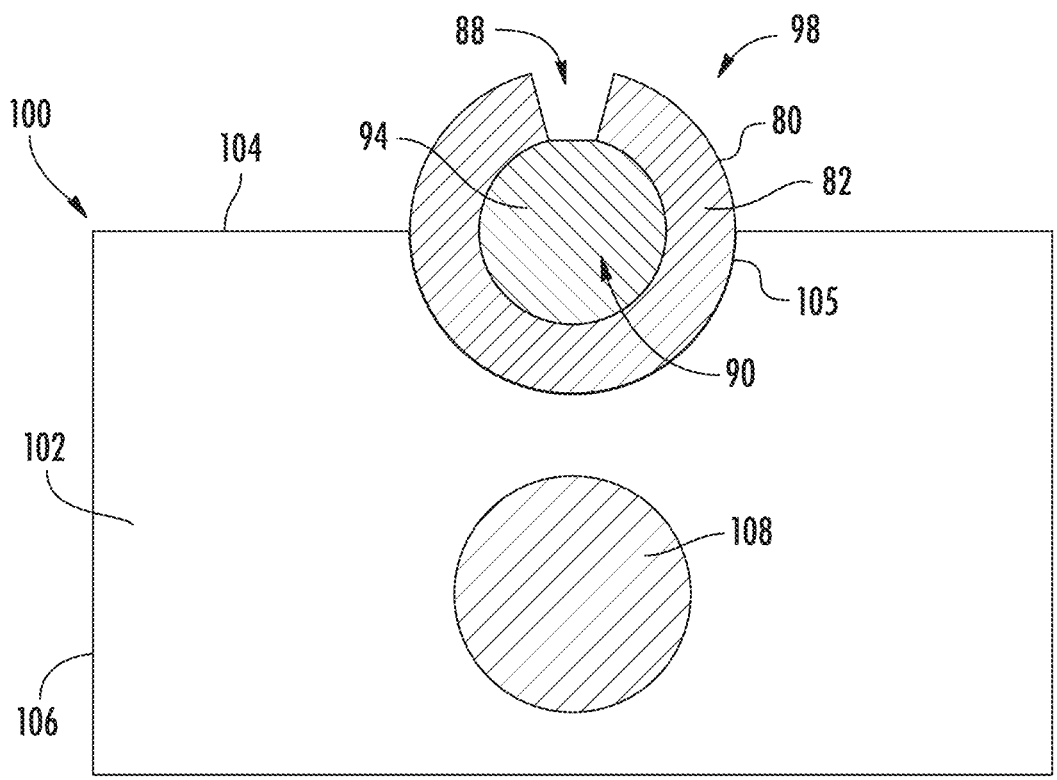
FIG. 10B is a cross-sectional view of the heating apparatus of FIG. 10A with a portion of a multi-fiber splice protector received within the recess of the heating apparatus.

FIG. 10B is a cross-sectional view of the heating apparatus 100 of FIG. 10A with a portion of a multi-fiber splice protector 98 received within the recess 105 of the heating apparatus 100. The strength member 80 bounds an inner cavity 90 that contains a thermoplastic hotmelt material 94, wherein each of the strength member 80 and the inner cavity 90 have a substantially cylindrical shape, and the longitudinal opening 88 is defined through the wall 82. As shown, the recess 105 of the heating apparatus 100 is sized and shaped to receive a lower half of the strength member 80 therein, such that nearly 50% of an external surface area of the strength member 80 is in contact with the portion of the body 102 defining the recess 105. In this manner, heat may be efficiently transferred by conduction from the heating element 108 to the body 102, and from the body 102 to the strength member 80 of the multi-fiber splice protector 98. In certain embodiments, heating apparatus 100 is set to the melting temperature of the thermoplastic hotmelt material 94 (e.g., about 200° C.).

Figure 10C:
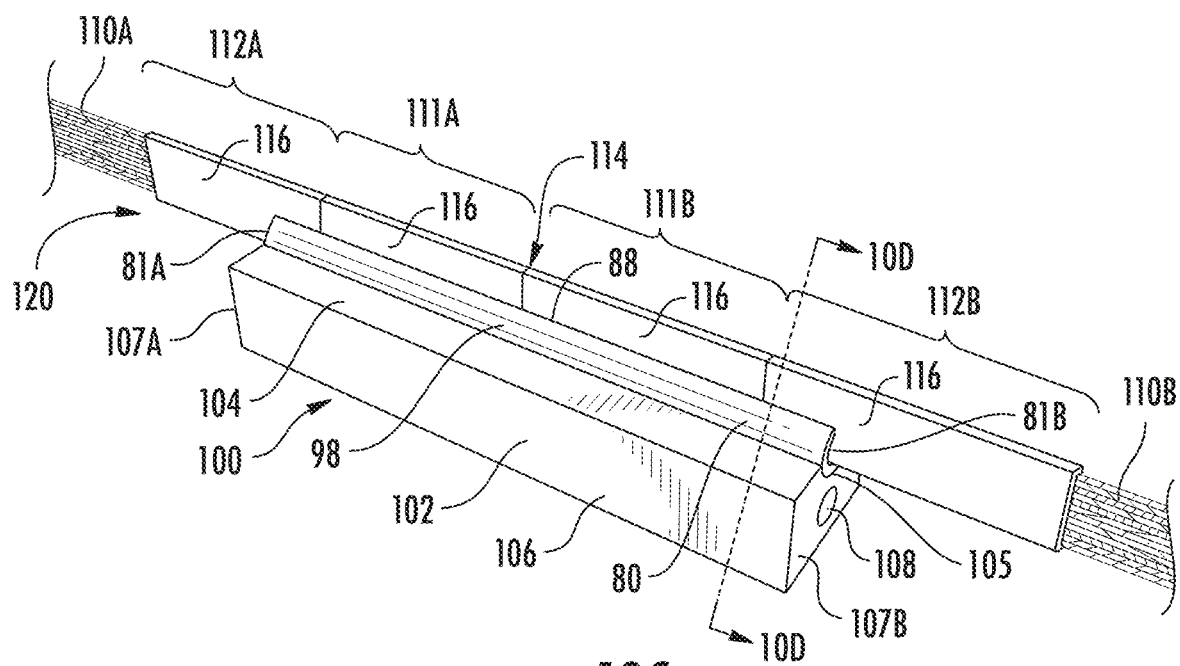
FIG. 10C is an upper perspective view of the heating apparatus and multi-fiber splice protector of FIG. 10B, following insertion of a portion of an overcoated fusion spliced optical fiber ribbon into the longitudinal opening of the multi-fiber splice protector.

FIG. 10C is an upper perspective view of the heating apparatus 100 and multi-fiber splice protector 98 of FIG. 10B, following insertion of a portion of an overcoated fusion spliced optical fiber ribbon 120 into the longitudinal opening 88 of the multi-fiber splice protector 98. The body 102 of the heating apparatus 100 is bounded by the upper surface 104, side surfaces 106, and end surfaces 107A, 107B, with the heating element 108 disposed within an interior of the body 102 in a direction parallel to the recess 105 defined in the body 102 below the upper surface 104. As shown, a length of the strength member 80 of the multi-fiber splice protector 98 may be substantially the same as a length of the body 102 of the heating element 108 between the end surfaces 107A, 107B. The fusion spliced optical fiber ribbon 120 comprises first and second optical fiber groups 110A, 110B that are joined at a splice region 114. Fibers of the first and second optical fiber groups 110A, 110B may be initially coated (e.g., with an acrylate coating over glass cladding), with portions of each optical fiber group 110A, 110B being previously stripped of such coating to form stripped sections 111A, 111B each retaining glass cladding. Ends of the stripped sections 111A, 111B are fusion spliced at the splice region 114. An overcoating 116 of thermoplastic hotmelt material extends over the splice region 114, the previously stripped sections 111A, 111B, and lengths 112A, 112B of coated fibers of the first and second optical fiber groups 110A, 110B. Each of the first and second optical fiber groups 110A, 110B comprises a plurality of optical fibers.

In certain embodiments, the stripped section 111A of each optical fiber of the first optical fiber group 110A has a first length, the stripped section 111B of each optical fiber of the second optical fiber group 110B has a second length, and the strength member 80 has a third length in the longitudinal direction that is greater than or equal to a sum of the first length and the second length. This ensures that the stripped sections 111A, 111B as well as the splice region 114 are protected within the strength member 80.

Figure 10D:
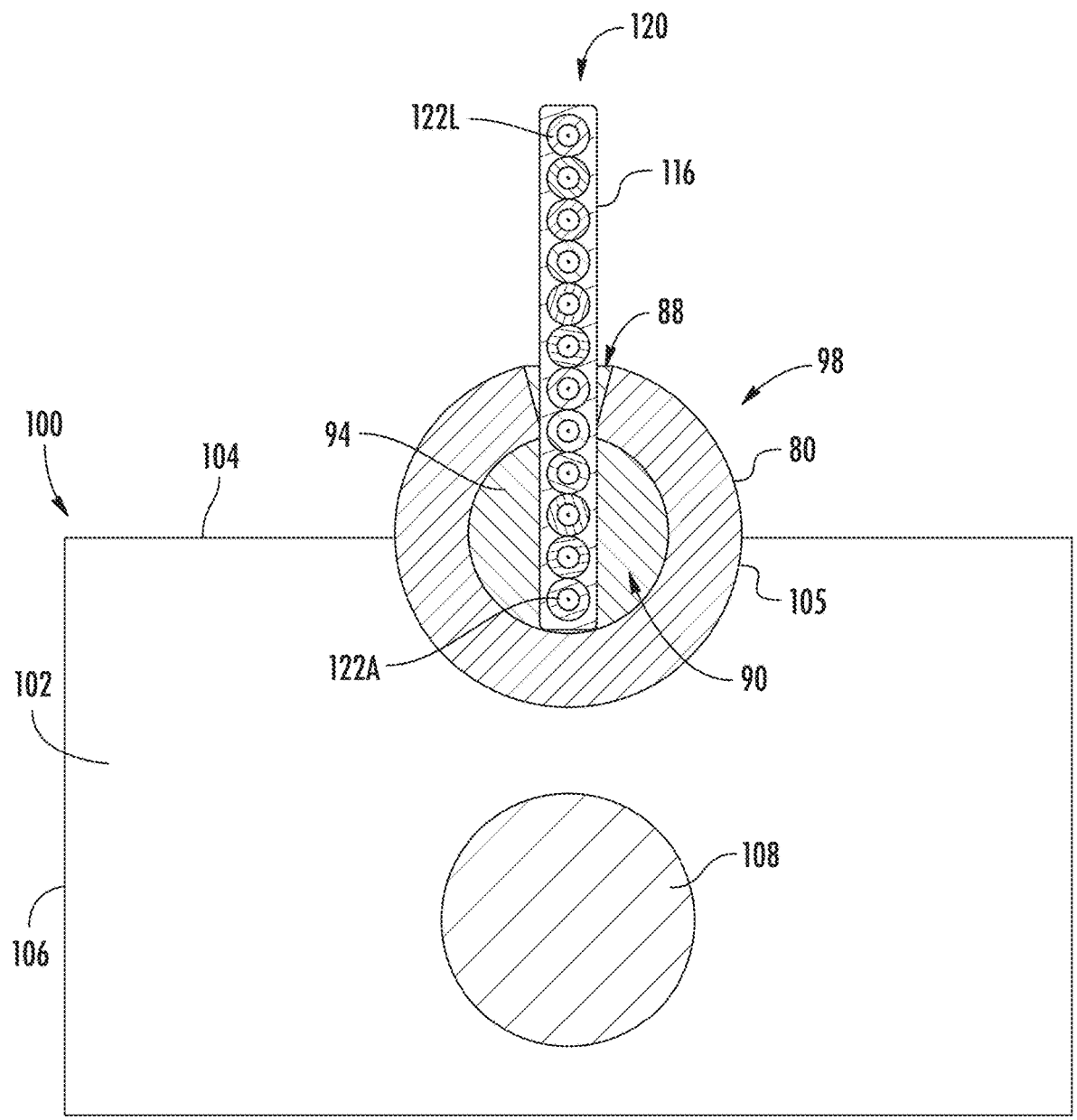
FIG. 10D is a cross-sectional view of the heating apparatus, multi-fiber splice protector, and fusion spliced optical fiber ribbon of FIG. 10C, following insertion of a portion of the fusion spliced optical fiber ribbon through the longitudinal opening and into the inner cavity of the multi-fiber splice protector.

FIG. 10D is a cross-sectional view, taken along section line "10D-10D" of FIG. 10C, of the heating apparatus 100, the multi-fiber splice protector 98, and fusion spliced optical fiber ribbon 120 of FIG. 10C. The same state of fabrication shown in FIG. 10C is shown in FIG. 10D, in which a portion of the fusion spliced optical fiber ribbon 120 has been inserted through the longitudinal opening 88 and into the inner cavity 90 of the multi-fiber splice protector 98. The fusion spliced optical fiber ribbon 120 includes fusion spliced optical fibers 122A-122L having a thermoplastic hotmelt overcoating 116, which may be of the same composition as the thermoplastic hotmelt material 94 initially present in the inner cavity 90 of the strength member 80. The remaining elements of FIG. 10D are the same as previously described in FIG. 10C.

FIGS. 10C and 10D each show a portion of the fusion spliced optical fiber ribbon 120 being inserted into the longitudinal opening 88 prior to manipulation (e.g., bending or rolling) of the fusion spliced optical fiber ribbon 120 to cause fusion spliced optical fibers to be present within the inner cavity 90 of the strength member 80 in a configuration other than exclusively a one-dimensional array, such as a close-packed configuration, a multi-dimensional array, or the like. It is to be understood that during such insertion, portions of the fusion spliced optical fiber ribbon 120 outside the multi-fiber splice protector 98 may be maintained in slight tension and manipulated (e.g., bent, rolled, or the like) to cause optical fibers 122A-122L to assume a configuration other than a one-dimensional array within the inner cavity 90 of the strength member 80. In certain embodiments, minimal to no manipulation of the optical fibers 122A-122L may be necessary, since the optical fibers may self-arrange into a two-dimensional stack within the inner cavity 90 due to the force of gravity. Although FIG. 10D shows the thermoplastic hotmelt overcoating 116 as distinct from the thermoplastic hotmelt material 94 initially present in the inner cavity 90, transfer of heat from the strength member 80 and molten thermoplastic hotmelt material 94 will cause the thermoplastic hotmelt overcoating 116 to melt and assimilate with the molten thermoplastic hotmelt material 94.

As can be appreciated, the non-coplanar arrangement of the fusion spliced optical fibers 122A-122L within the inner cavity 90 of the strength member 80 means that the fusion spliced optical fibers 122A-122L are not exclusively arranged in a one-dimensional array taken in a cross-sectional view perpendicular to a longitudinal (lengthwise) direction of a fiber optic cable. Such an arrangement does not preclude the presence of two or more groups of fusion spliced optical fibers 122A-122L arranged in different one-dimensional arrays that in combination form a multi-dimensional array, so long as all fusion spliced optical fibers 122A-122L of the plurality of fusion spliced optical fibers 122A-122L are not arranged in a single one-dimensional array. The non-coplanar arrangement of fusion spliced optical fibers can be expressed by considering there to be multiple groups of the fusion spliced optical fibers. To this end, in certain embodiments, a first group of fusion spliced optical fibers is arranged non-coplanar to a second group of the fusion spliced optical fibers within the inner cavity 90 of the strength member 80.

Any reference herein to non-coplanar first and second groups of fusion spliced optical fibers is neither intended to limit, nor serves to limit, the subject matter disclosed herein to fusion spliced optical fibers with fiber cores disposed in first and second planes such as a "two row" array. Any suitable configuration for arranging multiple groups of fusion spliced optical fibers, other than exclusively in a one-dimensional array, is contemplated by such language. In certain embodiments, a third group of fusion spliced optical fibers may be further provided, wherein at the fusion splice region, a third plane is definable through substantially parallel fiber cores of at least two optical fibers of the third group of fusion spliced optical fibers, with the first, second, and third planes being non-coplanar. In certain embodiments involving a total of twelve fusion spliced optical fibers, the fusion splice region may be configured as a 2×6 array, a 3×4 array, or a hexagonal close packed four-layer configuration, respectively. In certain embodiments, fusion spliced optical fibers may be placed in a spiral configuration so long as the fusion spliced optical fibers remain substantially parallel to one another (e.g., within one degree or within two degrees of deviation from parallel at any one position). Other configurations may be provided for groups of twelve fusion spliced fibers or for groups of fusion spliced fibers other than twelve in number. In certain embodiments, each group of optical fiber segments to be spliced may include 8, 12, 16, or 24 optical fibers. Other numbers of optical fibers may be provided. In certain embodiments, non-coplanar first and second groups of fusion spliced optical fibers each include at least three, or at least four, fusion spliced optical fibers. Such optical fibers may include single mode optical fibers or multi-mode optical fibers.

Figure 10E:
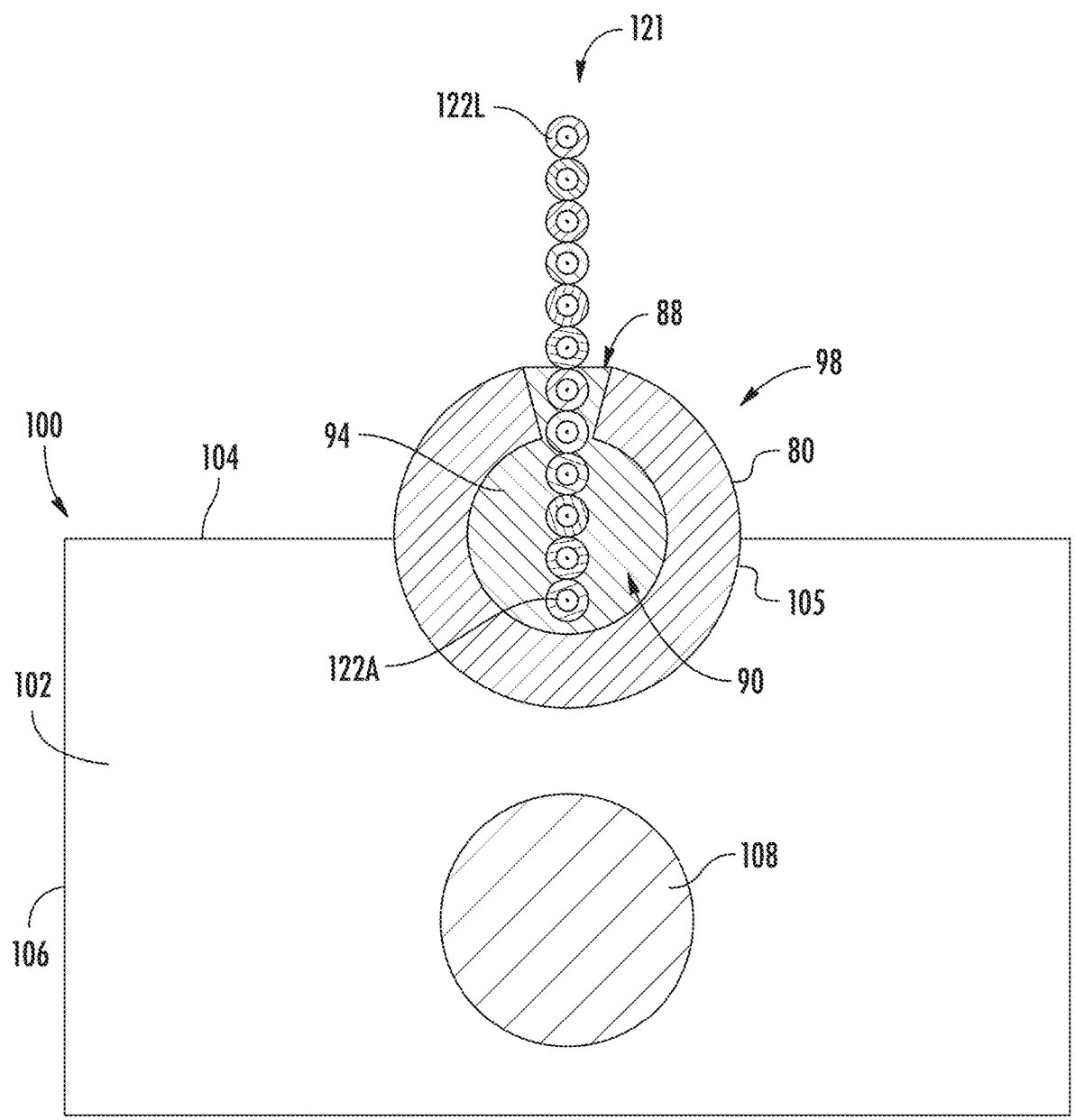
FIG. 10E is a cross-sectional view of the heating apparatus and multi-fiber splice protector of FIG. 10C, with multiple fusion spliced optical fibers of a plurality of non-overcoated (i.e., loose) optical fibers through the longitudinal opening and into the inner cavity of the multi-fiber splice protector.

FIG. 10E is a cross-sectional view of the heating apparatus 100 and multi-fiber splice protector 98 of FIG. 10C, according to one embodiment in which a group 121 of multiple fusion spliced optical fibers 122A-122L lacks any thermoplastic hotmelt overcoating prior to insertion of the optical fibers 122A-122L through the longitudinal opening 88 to contact thermoplastic hotmelt material 94 in the inner cavity 90 of the strength member 80. It is to be understood that during sequential insertion of the fusion spliced optical fibers 122A-122L through the longitudinal opening 88 into the inner cavity 90, portions of the fusion spliced optical fibers 122A-122L outside the multi-fiber splice protector 98 may be maintained in slight tension and manipulated (e.g., bent, rolled, or the like) to cause the optical fibers 122A-122L to assume a configuration other than a one-dimensional array within the inner cavity 90 of the strength member 80. The remaining elements of FIG. 10E are the same as illustrated and described in connection with FIG. 10D.

Figure 10F:
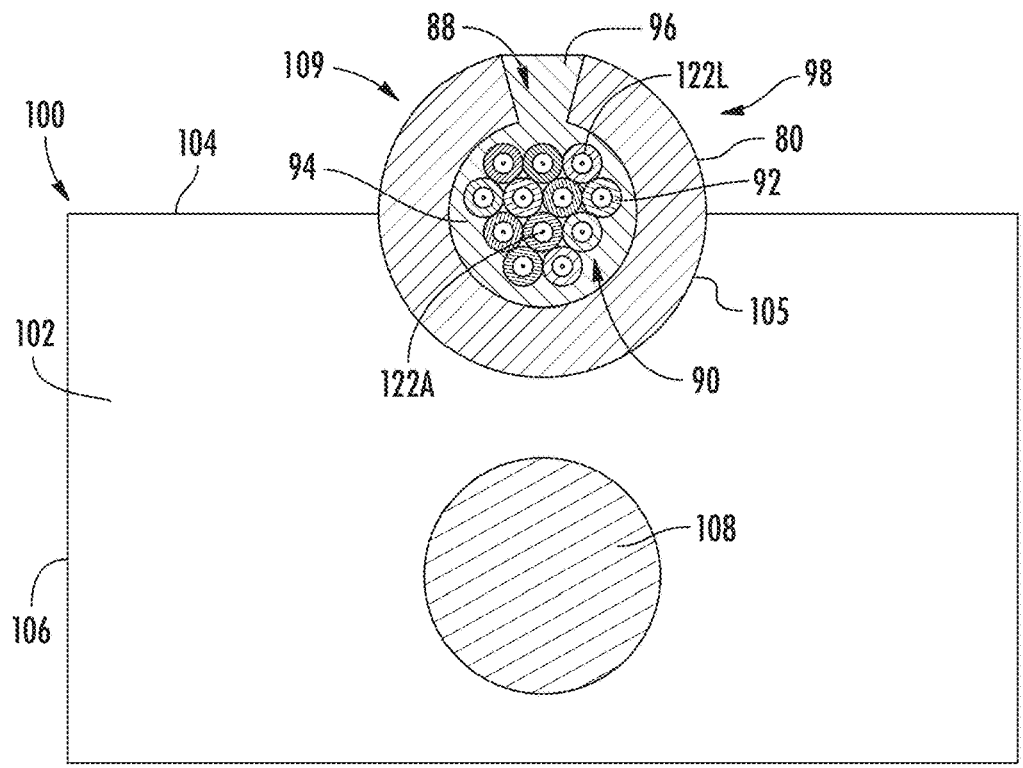
FIG. 10F is a cross-sectional view of the heating apparatus and multi-fiber splice protector of FIG. 10D, following insertion of the entire overcoated fusion spliced optical fiber ribbon into the inner cavity of the multi-fiber splice protector and manipulation of the fusion spliced optical fibers into a close-packed arrangement.

FIG. 10F is a cross-sectional view of the heating apparatus 100 and multi-fiber splice protector 98 of FIG. 10D, following insertion of the entire overcoated fusion spliced optical fiber ribbon into the inner cavity 90 of the multi-fiber splice protector 98 and manipulation of the fusion spliced optical fibers 122A-122L into a group 92 having close-packed arrangement, and following assimilation of thermoplastic hotmelt overcoating 116 into the thermoplastic hotmelt material 94 within the inner cavity 90. An extension portion 96 of thermoplastic hotmelt material 94 is present within the longitudinal opening 88, with the extension portion 96 being continuous with the thermoplastic hotmelt material 94 present in the inner cavity 90. As shown, the close-packed arrangement of the group 92 of fusion spliced optical fibers 122A-122L has a maximum width equal to four coated optical fibers, while the longitudinal opening 88 has a minimum width that is greater than the width of a single coated optical fiber and less than two times the width of a single coated optical fiber. Upon removal of the multi-fiber splice protector 98 from the heating apparatus 100 and cooling, fusion spliced optical fibers 122A-122L and multi-fiber splice protector 98 will form part of a multi-fiber cable assembly 109. The remaining elements of FIG. 10F are the same as previously shown and described in connection with FIG. 10D.

In an alternate embodiment, splice protector 98 is U-shaped with a thermoplastic hotmelt material 94 placed within the inner cavity 90, such that thermoplastic hotmelt material 94 occupies a portion of inner cavity 90 and extends beyond longitudinal opening 88. Splice protector 98 is placed within recess 105 of heating apparatus 100 where recess 105 is oriented such that inner cavity 90 extends in a direction parallel with top surface 104. Fusion spliced optical fibers 122A-122L are laid onto top surface 104 and pre-heated for about 2 seconds. The heating apparatus 100 is heated to the melting temperature of the thermoplastic hotmelt material 94. Once at least a portion of the thermoplastic hotmelt material 94 has melted (e.g., molten state), fusion spliced optical fibers 122A-122L are slid into inner cavity 90 of splice protector 98 such that fusion spliced optical fibers 122A-122L are housed within inner cavity 90 and thermoplastic hotmelt material 94 occupies the entirety of inner cavity 90.

An advantage of the U-shaped splice protector 98 described above is that the splice protector 98 is removable with respect to the fusion spliced optical fibers 122A-122L. To remove the installed splice protector, heating apparatus 100 applies heat onto the splice protector 98 such that the fusion spliced optical fibers 122A-122L can be slid out of the strength member 80 of splice protector 98. The ability to remove fusion spliced optical fibers 122A-122L from strength member 80 enables reworking of fusion spliced optical fibers, if necessary, and cutting shorter length of optical fibers such that the reworked fusion spliced optical fibers are easier to route.

Figure 10G:
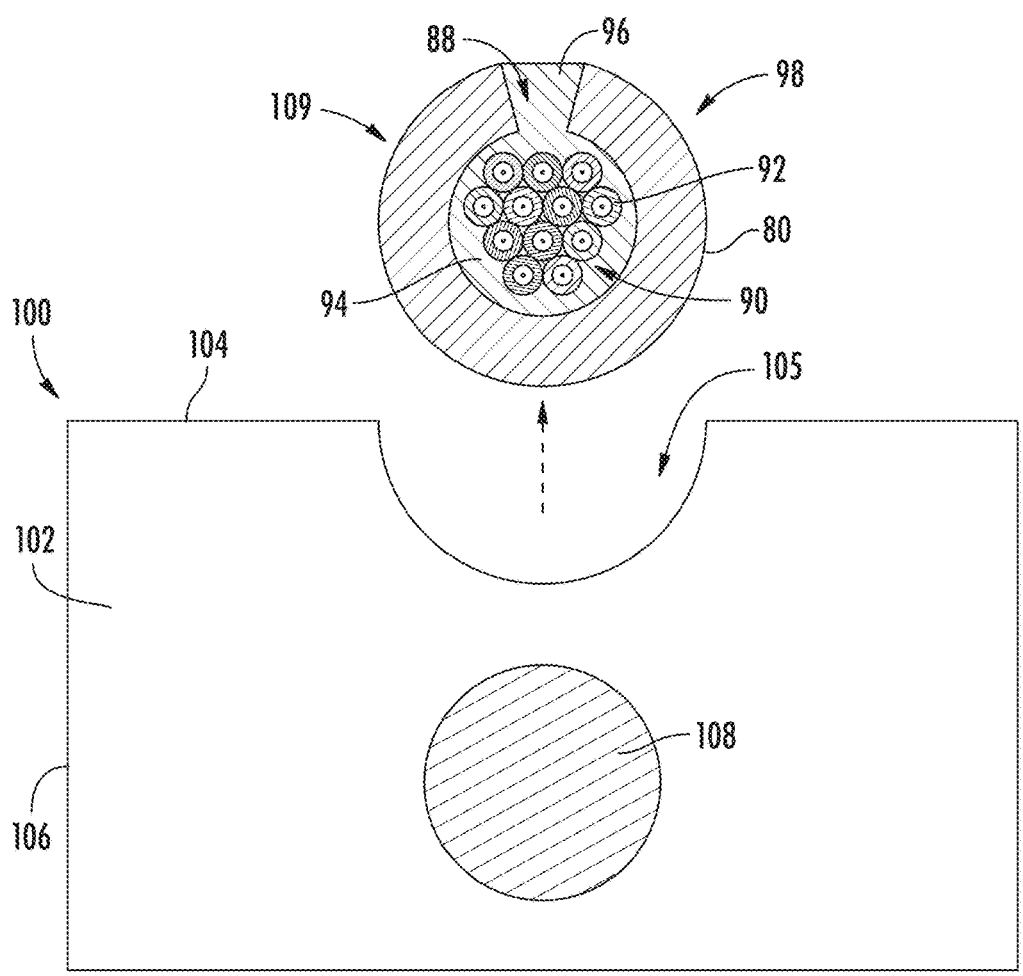
FIG. 10G illustrates the multi-fiber splice protector and fusion spliced optical fibers of FIG. 10F being removed from the recess of the heating apparatus to permit the strength member and thermoplastic hotmelt material of the multi-fiber splice protector to cool sufficiently to cause the thermoplastic hotmelt material to solidify around and encapsulate portions of the fusion spliced optical fibers.

FIG. 10G illustrates the multi-fiber splice protector 98 and group 92 of fusion spliced optical fibers 122A-122L of FIG. 10F being removed from the recess 105 of the heating apparatus 100 to permit the strength member 80 and thermoplastic hotmelt material 94 of the multi-fiber splice protector 98 to cool sufficiently to cause the thermoplastic hotmelt material 94 (as well as the extension portion 96 of thermoplastic hotmelt material 94) to solidify around and encapsulate the group 92 of the fusion spliced optical fibers 122A-122L. Such cooling may be to room temperature (e.g., 25° C.) or to any suitable temperature below a softening point of the thermoplastic hotmelt material 94. In certain embodiments, cooling may be aided by forced convection (e.g., using moving air or pressurized gas), by conductive contact with one or more cooled surfaces, or the like. In certain embodiments, the multi-fiber splice protector 98 may be lifted relative to the heating apparatus 100; alternatively, the multi-fiber splice protector 98 may remain stationary and the heating apparatus 100 may be moved relative to the multi-fiber splice protector 98. Excess thermoplastic hotmelt material 94 outside splice protector 98 (e.g., along outer surface 84) may be peeled off of the splice protector 98.

Figure 11:
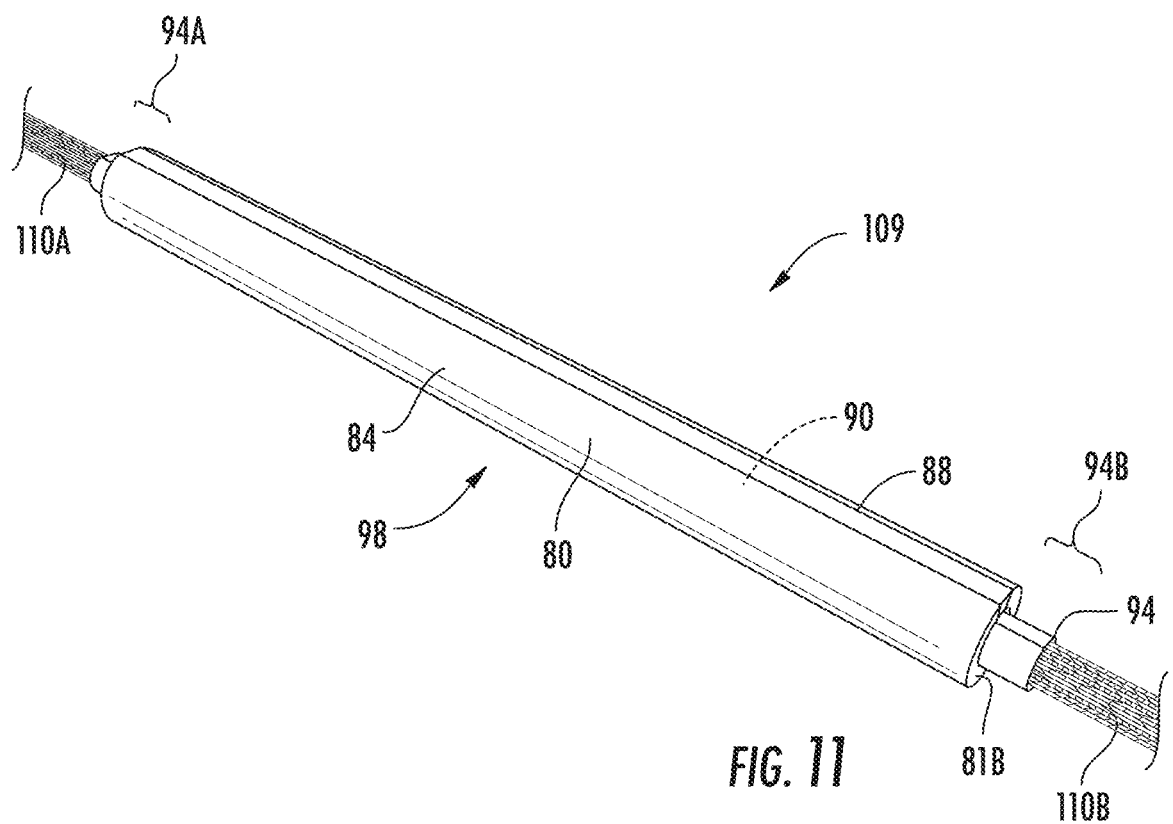
FIG. 11 is a perspective view of the multi-fiber splice protector and fusion spliced optical fibers of FIG. 10G following removal from the recess of the heating apparatus.

FIG. 11 is a perspective view of the multi-fiber splice protector 98 and multi-fiber cable assembly 109 of FIG. 10G following removal from the recess 105 of the heating apparatus 100 (FIG. 10G). The multi-fiber cable assembly 109 includes first and second optical fiber groups 110A, 110B that are fusion spliced, with a splice region and previously stripped portions of the first and second optical fiber groups 110A, 110B being encapsulated by thermoplastic hotmelt material 94 within the inner cavity 90 of the strength member 80. As shown, end portions 94A, 94B of the thermoplastic hotmelt material 94 extend in a direction parallel to the longitudinal opening 88 beyond first and second ends 81A, 81B of the strength member 80. The thermoplastic hotmelt material 94 may also fill the longitudinal opening 88.

Figure 12:
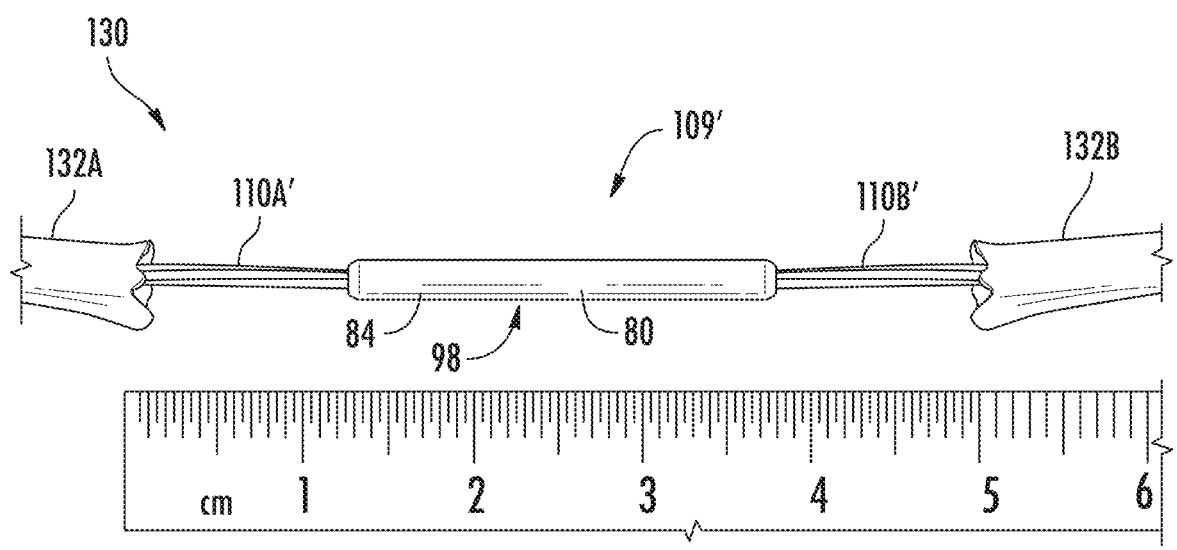
FIG. 12 is a top plan view of a portion of a fiber optic cable assembly including a multi-fiber splice protector as disclosed herein used to protect fusion splices between first and second segments of multiple optical fibers.

FIG. 12 is a top plan view of a portion of a fiber optic cable assembly 109' including the multi-fiber splice protector 98 as disclosed herein and used to protect fusion splices between first and second segments of multiple optical fibers 110A', 110B' that extend from jacketed portions 132A, 132B of a cable 130. As shown, the multi-fiber splice protector 98 has a width that is no greater than a width of the jacketed portions 132A, 132B, and the multi-fiber splice protector 98 has a length of about 2.5 cm. If desired, additional protection (e.g., jacketing) may be added over unjacketed portions of the first and second segments of multiple optical fibers 110A', 110B' and over at least portions of the multi-fiber splice protector 98.

Example 1

A first example demonstrating the fabrication of a fiber optic cable assembly incorporating fusion splices between two twelve-fiber cables will now be described.

A splice protector intended to receive twelve fusion spliced optical fibers (e.g., originally in loose tube format or rollable ribbon format) is designed. The splice protector includes a generally cylindrical strength member as disclosed herein, with an outer diameter of about 2.0 mm, a wall thickness of 0.45 mm, an inner cavity diameter of 1.0 mm to 1.1 mm, and wherein a longitudinal opening having a width of 0.33 mm is defined through the wall. The 2.0 mm outer diameter of the strength member allows a protected splice to be enclosed inside a 3.0 mm diameter cable jacket. Thinner wall thickness may be used for reducing bend resistance. Thermoplastic hotmelt material is provided within the inner cavity of the splice protector. The splice protector is placed in a heater that pre-melts the hotmelt adhesive in the inner cavity.

Twelve fusion spliced optical fibers arranged in a one-dimensional array are overcoated with thermoplastic hotmelt material to a thickness of no greater than about 0.35 mm, forming a ribbon matrix length of no greater than about 3.0 mm covering a fusion splice region. The central ribbonized fusion spliced optical fibers arranged in a one-dimensional array are inserted through the longitudinal opening into the inner cavity of a heated splice protector. The thermoplastic hotmelt material serving as a ribbon matrix melts upon contact with, and merges or assimilates with, molten thermoplastic hotmelt material already present in the strength member. Melting of the thermoplastic hotmelt material serving as the ribbon matrix allows the fusion spliced fibers in the inner cavity to be moved laterally, thereby creating space for the continuing insertion of the rest of the fusion spliced optical fibers into the inner cavity. Slight tension is applied on the fusion spliced optical fibers during insertion. At least some fusion spliced optical fibers are stacked inside the inner cavity of the strength member, with the fusion spliced optical fibers being parallel without crossing. Because of the narrow width of the longitudinal opening, the splice protector can be lifted from the heater by the fiber bundle. The splice protector is then cooled to ambient temperature, preferably using an electric fan, to cause the thermoplastic hotmelt material within the inner cavity to solidify, thereby encapsulating the fusion spliced optical fibers therein.

The total cross-sectional area of twelve 125 μm diameter uncoated fibers is about 0.147 mm$^2$, which is small relative to the 0.95 mm$^2$ cross-sectional area of a 1.1 mm diameter inner cavity. If the ribbon splice is precoated with thermoplastic hotmelt material to a total thickness of 0.35 mm, then the total cross-sectional area is about 1.1 mm$^2$, which is sufficient to completely fill the inner cavity of a strength member without requiring the thermoplastic hotmelt material to be initially present within the inner cavity.

Example 2

A second example demonstrating the fabrication of a fiber optic cable assembly incorporating fusion splices between two twelve-fiber cables will now be described, with reference to FIG. 12. The multi-fiber splice protector 98 includes a strength member 80 fabricated of stainless spring steel with an outer diameter of 2.0 mm, an inner diameter of 1.1 mm, and a length of 25 mm. An inner cavity of the strength member is partially pre-filled with PA682 hotmelt adhesive (Henkel). Twelve fusion spliced optical fibers arranged in a one-dimensional array are overcoated with PA682 thermoplastic hotmelt material to a thickness of no greater than about 0.35 mm, the thermoplastic overcoating is delaminated to a length of no more than about 3.0 mm, and the overcoated fusion splices are inserted through a longitudinal opening into the inner cavity of the strength member 80 in the same manner described in Example 1, followed by removal of the multi-fiber splice protector 98 from the recess of a heating apparatus and cooling as described above to form a fiber optic cable assembly 109' in which a distance between jacketed portions is 50 mm.

Example 3

A third example demonstrating the manufacturing process and corresponding properties of the manufactured splice protector will now be described.

Splice protector 98 includes a strength member 80 fabricated of 430 stainless steel sheet metal (with a thickness of 0.006 inches) and pre-cut into dimensions of 25 mm×6.8 mm. The sheet metal is bent and pressed into a U-shaped configuration where the strength member 80 has parallel sides. The overall thickness of the strength member 80 is 0.70 mm with a height of the inner cavity 90 of 0.4 mm.

A polyamide hot melt compound or coating (PA682) is used as adhesive to fill inner cavity 90. The polyamide hot melt compound is molten at 200° C. and is dispensed into a PTFE tape with a width of 4 mm. The hot melt coating has a thickness of 0.35 mm and is separated from the PTFE tape resulting in a hot melt strip. The hot melt strip is free from air voids and cut to an appropriate length corresponding to the length of the inner cavity 90 of strength member 80. The hot melt strip is inserted into inner cavity 90 to form the splice protector 98.

Twelve optical fiber splices are applied to the splice protector 98 as described previously. The tensile strength of the ribbon splice with low profile splice protector 98 is around 50 pounds, exceeding that of a conventional heat shrink splice protector having a shorter length. Without wishing to be held to any particular theory, it is believed that the difference in tensile strength is because the splices are attached to both longitudinal sides of the strength member 80, whereas conventional heat shrink splice protectors provide mechanical support on one side.

Those skilled in the art will appreciate that various modifications and variations can be made without departing from the spirit or scope of the invention. Since modifications, combinations, sub-combinations, and variations of the disclosed embodiments incorporating the spirit and substance of the invention may occur to persons skilled in the art, the invention should be construed to include everything within the scope of the appended claims and their equivalents. The claims as set forth below are incorporated into and constitute part of this detailed description.

It will also be apparent to those skilled in the art that unless otherwise expressly stated, it is in no way intended that any method in this disclosure be construed as requiring that its steps be performed in a specific order. Accordingly, where a method claim below does not actually recite an order to be followed by its steps or it is not otherwise specifically stated in the claims or descriptions that the steps are to be limited to a specific order, it is no way intended that any particular order be inferred.

What is claimed is:

1. A multi-fiber splice protector comprising:
a strength member comprising at least one wall arranged in a tubular shape having a central axis extending in a longitudinal direction, wherein the strength member is bend-resistant, the at least one wall bounds an inner cavity extending in the longitudinal direction, and a longitudinal opening extends through an entire thickness of the at least one wall to permit passage of a coated optical fiber into the inner cavity; and
a thermoplastic hotmelt material arranged within the inner cavity;

wherein the longitudinal opening comprises a first width extending in a direction transverse to the longitudinal direction, and the first width is greater than a diameter of one coated optical fiber but smaller than two times the diameter of one coated optical fiber; and wherein the inner cavity is configured to receive a plurality of coated optical fibers, the inner cavity comprises a second width extending in the direction transverse to the longitudinal direction, and the second width is at least two times greater than the first width.

2. The multi-fiber splice protector of claim 1, wherein the strength member has an outer diameter of no greater than 2.5 mm.

3. The multi-fiber splice protector of claim 1, wherein the thermoplastic hotmelt material has a heat resistance temperature of at least 100° C., a melting temperature of less than 240° C., and a melt viscosity of less than 10,000 cps.

4. The multi-fiber splice protector of claim 1, wherein an exterior of the strength member comprises a generally cylindrical shape, and the inner cavity of the strength member comprises a generally cylindrical shape.

5. The multi-fiber splice protector of claim 1, wherein the strength member comprises opposing first and second ends, and the thermoplastic hotmelt material extends beyond the first end by at least 1 mm, and the thermoplastic hotmelt material extends beyond the second end by at least 1 mm.

6. The multi-fiber splice protector of claim 1, wherein the thermoplastic hotmelt material fills 85% to 100% of a volume of the inner cavity of the strength member prior to insertion of at least one coated optical fiber into the inner cavity.

7. The multi-fiber splice protector of claim 1, wherein the at least one wall comprises glass, metal, or a ceramic material.

8. A fiber optic cable assembly comprising:
a first fiber optic cable section comprising a first plurality of optical fibers, and a second fiber optic cable section comprising a second plurality of optical fibers, wherein each optical fiber of the first and second pluralities of optical fibers includes a pre-coated section and a stripped section;
a plurality of fusion splices including a plurality of splice joints joining ends of the stripped sections of the first plurality of optical fibers with ends of the stripped sections of the second plurality of optical fibers to form a plurality of fusion spliced optical fibers; and
a multi-fiber splice protector comprising a strength member including at least one wall arranged in a tubular shape having a central axis extending in a longitudinal direction, wherein the strength member is bend-resistant, the at least one wall bounds an inner cavity extending in the longitudinal direction, and a longitudinal opening extends through an entire thickness of the at least one wall to permit passage of a pre-coated section of a fusion spliced optical fiber of the plurality of fusion spliced optical fibers into the inner cavity;
wherein fusion spliced optical fibers of the plurality of fusion spliced optical fibers are not exclusively arranged in a one-dimensional array within the inner cavity; and
wherein a thermoplastic hotmelt material is present in the inner cavity of the strength member to encapsulate the plurality of fusion spliced optical fibers, including the plurality of splice joints as well as at least the stripped sections of the first and second pluralities of optical fibers.

9. The fiber optic cable assembly of claim 8, wherein the longitudinal opening comprises a first width extending in a direction transverse to the longitudinal direction, and the first width is greater than a diameter of one pre-coated section of a fusion spliced optical fiber but smaller than two times the diameter of one pre-coated section of a fusion spliced optical fiber.

10. The fiber optic cable assembly of claim 8, wherein the strength member has an outer diameter of no greater than 2.5 mm.

11. The fiber optic cable assembly of claim 8, wherein the thermoplastic hotmelt material has a heat resistance temperature of at least 100° C., a melting temperature of less than 240° C., and a melt viscosity of less than 10,000 cps.

12. The fiber optic cable assembly of claim 8, wherein an exterior of the strength member comprises a generally cylindrical shape, and the inner cavity of the strength member comprises a generally cylindrical shape.

13. The fiber optic cable assembly of claim 8, wherein the stripped section of each optical fiber of the first plurality of optical fibers has a first length, the stripped section of each optical fiber of the second plurality of optical fibers has a second length, and the strength member has a third length in the longitudinal direction that is greater than or equal to a sum of the first length and the second length.

14. The fiber optic cable assembly of claim 8, wherein the strength member comprises opposing first and second ends, and the thermoplastic hotmelt material extends beyond the first end by at least 1 mm, and the thermoplastic hotmelt material extends beyond the second end by at least 1 mm.

15. The fiber optic cable assembly of claim 8, wherein the at least one wall comprises glass, metal, or a ceramic material.

16. The fiber optic cable assembly of claim 8, wherein the first plurality of optical fibers are part of a first optical fiber ribbon, and the second plurality of optical fibers are part of a second optical fiber ribbon.

17. The fiber optic cable assembly of claim 8, wherein a volume of the inner cavity of the strength member not occupied by the plurality of fusion spliced optical fibers is 100% filled with the thermoplastic hotmelt material.

18. A method for fabricating a fiber optic cable assembly, the method comprising:
heating a strength member comprising at least one wall arranged in a tubular shape having a central axis extending in a longitudinal direction, wherein the at least one wall bounds an inner cavity extending in the longitudinal direction, a longitudinal opening extends through an entire thickness of the at least one wall, a solid thermoplastic hotmelt material is arranged within the inner cavity prior to the heating, the longitudinal opening comprises a first width extending in a direction transverse to the longitudinal direction; and the heating is sufficient to melt the solid thermoplastic hotmelt material;
sequentially inserting individual fusion spliced optical fibers of a plurality of fusion spliced optical fibers through the longitudinal opening into the inner cavity and the melted thermoplastic hotmelt material, while manipulating the plurality of fusion spliced optical fibers to cause fusion spliced optical fibers of the plurality of fusion spliced optical fibers inserted into the inner cavity to not be exclusively arranged in a one-dimensional array within the inner cavity; and
permitting the strength member and the melted thermoplastic hotmelt material to cool sufficiently to cause the thermoplastic hotmelt material to solidify around and encapsulate splice joints and stripped sections of fusion spliced optical fibers of the plurality of fusion spliced optical fibers.

19. The method of claim 18, wherein the first width is greater than a diameter of one coated optical fiber but smaller than two times the diameter of one coated optical fiber.

20. The method of claim 18, further comprising performing the following steps prior to sequentially inserting individual fusion spliced optical fibers of the plurality of fusion spliced optical fibers through the longitudinal opening into the inner cavity:
ribbonizing a first plurality of optical fibers emanating from a first fiber optic cable section using a thermoplastic hotmelt material to form a first ribbon matrix, wherein each optical fiber of the first plurality of optical fibers includes a pre-coated section and a stripped section;
ribbonizing a second plurality of optical fibers emanating from a second fiber optic cable section using a thermoplastic hotmelt material to form a second ribbon matrix, wherein each optical fiber of the second plurality of optical fibers includes a pre-coated section and a stripped section;
mass fusion splicing ends of the stripped sections of the first plurality of optical fibers with ends of the stripped sections of the second plurality of optical fibers to form the plurality of fusion spliced optical fibers;
delaminating a portion of the first ribbon matrix proximate to transitions between the pre-coated sections and the stripped sections of the first plurality of optical fibers; and
delaminating a portion of the second ribbon matrix proximate to transitions between the pre-coated sections and the stripped sections of the second plurality of optical fibers.

21. The method of claim 18, wherein the heating of the strength member comprises inserting at least a portion of the strength member into a longitudinal recess defined in a support member to contact at least one surface bounding the longitudinal recess, and operating a heating element in conductive thermal communication with the support member.

22. The method of claim 21, wherein the permitting of the strength member and the thermoplastic hotmelt material to cool comprises removing the strength member from the longitudinal recess.

23. The method of claim 18, wherein the thermoplastic hotmelt material has a heat resistance temperature of at least 100° C., a melting temperature of less than 240° C., and a melt viscosity of less than 10,000 cps.

24. The method of claim 18, wherein the strength member has an outer diameter of no greater than 2.5 mm.

25. The method of claim 18, wherein the strength member comprises opposing first and second ends, and the thermoplastic hotmelt material extends beyond the first end by at least 1 mm, and the thermoplastic hotmelt material extends beyond the second end by at least 1 mm.

* * * * *